(12) United States Patent
Kimura

(10) Patent No.: US 7,729,134 B2
(45) Date of Patent: Jun. 1, 2010

(54) POWER CONVERSION CIRCUIT, DRIVING METHOD AND DRIVE UNIT THEREOF

(75) Inventor: Tomonori Kimura, Obu (JP)

(73) Assignee: DENSO CORPORATION, Kariya (JP)

( * ) Notice: Subject to any disclaimer, the term of this patent is extended or adjusted under 35 U.S.C. 154(b) by 221 days.

(21) Appl. No.: 12/149,260

(22) Filed: Apr. 29, 2008

(65) Prior Publication Data

US 2008/0278972 A1 Nov. 13, 2008

(30) Foreign Application Priority Data

May 11, 2007 (JP) ............................ 2007-126933

(51) Int. Cl.
*H02M 3/335* (2006.01)
*G05F 1/10* (2006.01)
(52) U.S. Cl. .............................. 363/20; 363/59; 363/62; 323/222; 323/259
(58) Field of Classification Search ................... 363/16, 363/20, 59, 60, 62, 63, 131; 323/222, 259
See application file for complete search history.

(56) References Cited

U.S. PATENT DOCUMENTS

| | | | |
|---|---|---|---|
| 5,545,971 A | * | 8/1996 | Gomez et al. ............... 323/259 |
| 6,946,820 B2 | | 9/2005 | Ishii et al. |
| 7,183,754 B2 | * | 2/2007 | Tsuruya ....................... 323/272 |
| 7,193,396 B2 | * | 3/2007 | Orr ............................. 323/225 |
| 2008/0130326 A1 | * | 6/2008 | Kuan ....................... 363/21.14 |
| 2008/0130339 A1 | * | 6/2008 | McDonald et al. .......... 363/127 |
| 2009/0141521 A1 | * | 6/2009 | Yang ............................ 363/49 |

FOREIGN PATENT DOCUMENTS

JP A-2002-223157 8/2002

* cited by examiner

*Primary Examiner*—Adolf Berhane
(74) *Attorney, Agent, or Firm*—Posz Law Group, PLC

(57) ABSTRACT

A power conversion circuit capable of varying an output voltage within a range from a negative voltage lower than a ground voltage to a positive voltage higher than a supply voltage, and a driving method and a drive unit are provided. A power conversion circuit includes a transformer with a 1:1 ratio between the primary winding and secondary winding, a voltage outputting capacitor, and four switches. The power conversion circuit can be operated as a DC-DC converter of a step-up type, a step-up-and-down type, a step-down type, an inverted-output step-up-and-down type, or an inverted-output step-up type by selecting two switches used for control from among the four switches and alternately turning the two switches on. By switching the operating modes of the power conversion circuit, the output voltage can be varied within a range from a negative voltage to a positive voltage higher than a supply voltage.

12 Claims, 24 Drawing Sheets

IN CASE WHERE Iout<0 IS MET:

IN CASE WHERE Iout>0 IS MET:

MODE B1

MODE B2

IN CASE WHERE Iout<0 IS MET:

MODE B3

MODE B4

IN CASE WHERE Iout>0 IS MET:

MODE D1

MODE D2

IN CASE WHERE Iout<0 IS MET:

MODE D3

MODE D4

IN CASE WHERE Iout>0 IS MET:

MODE E1        MODE E2

IN CASE WHERE Iout<0 IS MET:

MODE E3

MODE E4

IN CASE WHERE Iout<0 IS MET:

MODE A3

MODE A4

IN CASE WHERE Iout>0 IS MET:

MODE B1

MODE B2

IN CASE WHERE Iout<0 IS MET:

MODE B3

MODE B4

IN CASE WHERE Iout<0 IS MET:

MODE C3

MODE C4

IN CASE WHERE Iout<0 IS MET:

MODE D3

MODE D4

IN CASE WHERE Iout>0 IS MET:

MODE E1

MODE E2

IN CASE WHERE Iout<0 IS MET:

MODE E3

MODE E4

POWER CONVERSION CIRCUIT, DRIVING METHOD AND DRIVE UNIT THEREOF

CROSS REFERENCE TO RELATED APPLICATIONS

The present invention is based on and claims priority to Japanese Patent Application No. 2007-126933 filed May 11, 2007, the entire contents of which are incorporated herein by reference.

BACKGROUND OF THE INVENTION

1. Field of the Invention

The present invention relates to a non-isolated power conversion circuit, and more specifically to a DC-DC converter including one having a step-up, step-down and combined capabilities, a driving method and a drive unit.

2. Description of the Related Art

Conventionally non-isolated power conversion circuits are known that include DC-DC converters in which a capacitor is charged via a coil by making or breaking a conduction path extending from a direct-current (DC) power supply to the coil, via a switching element, and causing a desired DC voltage to be output.

Moreover, as for non-isolated DC-DC converters, a step-down type that produces a DC voltage lower than a supply voltage of a DC power supply, a step-up type that produces a DC voltage higher than the supply voltage of the DC power supply, and a step-up-and-down type capable of producing a DC voltage higher than the supply voltage, from a DC voltage lower than the supply voltage of the DC power supply are representative. None of these types of non-isolated DC-DC converters however can produce a negative voltage lower than a ground voltage of 0V corresponding to the potential on a negative electrode side of the DC power supply.

Moreover, non-isolated DC-DC converter types such as a Ćuk converter, a Zeta converter, a single ended primary inductor converter (SEPIC), or any other type of converter that charges and discharges a capacitor are known. However, while such types of converters can output a voltage lower than the supply voltage or a voltage higher than the ground voltage, none can control an output voltage over a wide range from a negative voltage equal to or lower than the ground voltage to a positive voltage exceeding the supply voltage.

Multiple-output DC-DC converters including combinations of various types of DC-DC converters are also known, for example as described in JP-A-2003-164143, and have been developed in an attempt to address limitations of the above described converters.

For example, the multiple-output DC-DC converter described in JP-A-2003-164143 includes, as shown, for example, in FIG. 17 of the present application, a DC power supply 20, and a coil 23 having one terminal connected to a negative electrode side of the DC power supply 20, that is, a ground, via a switch 21 and having the other terminal connected to a positive electrode side of the DC power supply 20 Via a switch 22. The anode of a diode 24 is connected to a node between the coil 23 and switch 21. A capacitor 25 having one terminal grounded to the ground and a load 31 having one terminal grounded to the ground are connected to the cathode of the diode 24. The cathode of a diode 26 is connected to a node between the coil 23 and switch 22. A capacitor 27 having one terminal grounded to the ground and a load 32 having one terminal grounded to the ground are connected to the anode of the diode 26.

A control circuit 30 turns the switch 21 on or off while the switch 22 is held on causing a current to flow into the coil 23 while the switch 21 is held on. The control circuit 30 further controls the capacitor 25 via the diode 24 using a high voltage generated at the coil 23 while the switch 21 is held off so that the voltage at the capacitor 25 will have a voltage value larger than the supply voltage. In other words, the switch 22 being held on causes the coil 23, switch 21, and diode 24 to operate as a step-up DC-DC converter, and supplies a DC voltage Vo1, which is higher than the supply voltage of the DC power supply 20, to the load 31.

The control circuit 30 turns the switch 22 on or off while the switch 21 is held on causing a current to flow into the coil 23 while the switch 22 is on and causes a current to flow into the coil 23 via the diode 26 while the switch 22 is off. Thus, the control circuit 30 controls an output voltage fed from the capacitor 27 to the load 32 to be a negative voltage lower than the ground voltage. In other words, the control circuit 30 holds the switch 21 on allowing the coil 23, switch 22, and diode 26 to operate as an inverted-output step-up-and-down DC-DC converter.

While, according to the foregoing multiple-output DC-DC converter, both a positive voltage and a negative voltage can be outputted to an external load, disadvantages are present in that the multiple-output DC-DC converter outputs the positive voltage and negative voltage through different terminals thereof. Therefore, although the multiple-output DC-DC converter can output the positive voltage and negative voltage to loads connected to the respective terminals, the multiple-output DC-DC converter cannot change an output voltage directed to one load from the negative voltage to the positive voltage.

Moreover, even if circuitry that outputs a positive voltage and a negative voltage to one load via a switch or the like can be devised and a range of voltages that can be outputted falls into a voltage range higher than the supply voltage of the DC power supply 20 and a negative voltage range lower than the ground voltage disadvantages are still present. For example, since the DC-DC converter that produces the positive voltage is of a step-up type and the DC-DC converter that produces the negative voltage is of a step-up-and-down type, an inverted output provided. The inversion poses a disadvantage in that voltages in a range relative to the ground voltage of 0V to the supply voltage cannot be outputted.

SUMMARY OF THE INVENTION

The present invention addresses the foregoing disadvantages. An object of the present invention is to provide a power conversion circuit capable of outputting an arbitrary voltage within a range from a negative voltage lower than a ground voltage to a positive voltage higher than a supply voltage, and a driving method and a drive unit.

A power conversion circuit intended to accomplish the above object is provided with a transformer that includes a primary winding having one terminal connected to a positive electrode side of a DC power supply and a secondary winding having one terminal connected to a negative electrode side of the DC power supply so that that phase in the secondary winding will be opposite to that in the primary winding, and that has the ratio between the numbers of turns of the primary and secondary windings set to 1:1, and a voltage outputting capacitor having one terminal connected to the negative electrode side of the DC power supply.

The other terminal of the secondary winding of the transformer is connected to the positive electrode side of the DC power supply via a first switch, and connected to the other terminal of the capacitor via a third switch. The other terminal of the primary winding of the transformer is connected to the negative electrode side of the DC power supply via a second switch, and is connected to the other terminal of the capacitor via a fourth switch.

In the foregoing power conversion circuit several operating modes can be used depending on the function desired. For example, when the second switch and fourth switch are alternately turned on and the other switches are held off, the power conversion circuit operates as a step-up DC-DC converter capable of producing an output voltage Vout higher than the supply voltage Vin of the DC power supply, that is, an output voltage Vout which meets Vout>Vin. When the second switch and third switch are alternately turned on and the other switches are held off, the power conversion circuit operates as a step-up-and-down DC-DC converter capable of producing an output voltage Vout higher than the ground voltage of 0V corresponding to the potential on the negative electrode side of the DC power supply, that is, an output voltage Vout which meets Vout>0. When the fourth switch and third switch are alternately turned on and the other switches are held off, the power conversion circuit operates as a step-down DC-DC converter capable of producing a positive output voltage Vout lower than the supply voltage Vin of the DC power supply, that is, a positive output voltage Vout which meets Vin>Vout. When the fourth switch and first switch are alternately turned on and the other switches are held off, the power conversion circuit operates as an inverted-output step-up-and-down DC-DC converter capable of producing an output voltage Vout lower than the supply voltage Vin of the DC power supply, that is, an output voltage Vout which meets Vout<Vin. When the third switch and first switch are alternately turned on and the other switches are held off, the power conversion circuit operates as an inverted-output step-up DC-DC converter capable of producing a negative output voltage Vout lower than the ground voltage of 0V corresponding to the potential on the negative electrode side of the DC power supply, that is, a negative output voltage Vout which meets Vout<0.

Consequently, according to an exemplary power conversion circuit, when the operating mode is switched to any of the above described operating modes, an arbitrary voltage can be outputted within a range from the negative voltage lower than the ground voltage to the positive voltage higher than the supply voltage expanding the usability. Moreover, according to an exemplary power conversion circuit, since an output voltage can be controlled within the wide range from the negative voltage to the positive voltage, the power conversion circuit can be used for producing an alternating voltage.

The direction of a current flowing into each switch varies depending on the direction of a load current that flows into a load connected to the power conversion circuit or which of the above described operating modes is selected. Therefore, the first to fourth switches are realized with bidirectional switches capable of bi-directionally conducting or cutting off a current.

A bidirectional switch including a pair of metal-oxide semiconductor field-effect transistors (MOSFETs) or isolated gate bipolar transistors (IGBTs) that includes back-to-back diodes and that has the back-to-back diodes connected to be oriented in mutually opposite directions may be adopted. Alternatively, a bidirectional switch including a pair of reverse-blocking IGBTs connected reversely in parallel with each other may be adopted.

According to an exemplary driving method, when two out of the first to fourth switches are alternately turned on as in the above described operating modes, the first to fifth driving modes in which the power conversion circuit is operated as a DC-DC converter of a step-up type, a step-up-and-down type, a step-down type, an inverted-output step-up-and-down type, or an inverted-output step-up type are established as the driving modes for the power conversion circuit. By switching the driving modes according to an output voltage, the power conversion circuit is operated.

When the operating mode of the power conversion circuit is appropriately switched to any of the above described operating modes according to the output voltage, the output voltage of the power conversion circuit can be controlled into an arbitrary voltage ranging from the negative voltage to the positive voltage.

In a first driving mode, the power conversion circuit can be operated as a step-up DC-DC converter, and the output voltage Vout can be controlled to satisfy the condition of Vout>Vin. In a second driving mode, the power conversion circuit can be operated as a step-up-and-down DC-DC converter and the output voltage Vout can be controlled to satisfy the condition of Vout>0. In a third driving mode, the power conversion circuit can be operated as a step-down DC-DC converter and the output voltage Vout can be controlled to satisfy the condition of Vin>Vout>0. In a fourth driving mode, the power conversion circuit can be operated as an inverted-output step-up-and-down DC-DC converter and the output voltage Vout can be controlled to satisfy the condition of Vout<Vin. In a fifth driving mode, the power conversion circuit can be operated as an inverted-output step-up DC-DC converter and the output voltage Vout can be controlled to satisfy the condition of Vout<0.

When the driving modes for the power conversion circuit are actually switched according to the output voltage the modes are selected according to the following conditions. When the output voltage Vout is equal to or higher than a first voltage V1 higher than the supply voltage Vin, that is, when Vout≧V1 is met, the first driving mode is selected. When the output voltage Vout has a voltage value that is equal to or larger than a second voltage V2 lower than the supply voltage Vin, that falls below the first voltage V1, and that is close to the supply voltage Vin, that is, when V2≦Vout<V1 is met, the second driving mode is selected. When the output voltage Vout is equal to or higher than a third voltage higher than the ground voltage of 0V and falls below the second voltage V2, that is, when V3≦Vout<V2 is met, the third driving mode is selected. When the output voltage Vout has a voltage value that is equal to or larger than a fourth voltage V4 lower than the ground voltage of 0V, that falls below the third voltage V3, and that is close to the ground voltage of 0V, that is, when V4≦Vout<V3 is met, the fourth driving mode is selected. When the output voltage Vout falls below the fourth voltage V4 lower than the ground voltage of 0V, that is, when Vout<V4 is met, the fifth driving mode is selected. Thus, the output voltage of the power conversion circuit can be more reliably controlled into an arbitrary voltage ranging from the negative voltage to the positive voltage.

In each of the driving modes, when two switches are alternately turned on, a deviation of the output voltage of the power conversion circuit from a command voltage having a target value is obtained. Based on the deviation, a ratio at which switches are held on within a certain driving cycle is obtained. A pulse-width modulated (PWM) signal associated with the ratio is used to alternate the on and off states of the switches. It should be noted that although the driving method can control the output voltage of the power conversion circuit into the command voltage, when one driving cycle in which switches are alternately turned on is switched to another, currents flow through the windings of the transformer. When one of switches is first turned on during the next driving cycle, a power loss or turn-on loss occurs in the switch.

In order to prevent occurrence of turn-on loss, a driving method employing a so-called current boundary mode may be adopted so that currents flowing through the respective windings of the transformer can be reduced to zero, for example at the point in every driving cycle when switches are alternately turned on in each of the driving modes.

When the power conversion circuit is driven in the current boundary mode, the required on time for a switch sufficient to control the output voltage into the command voltage is calculated based on the output voltage and command voltage. The load current for each driving cycle of switches in a driving mode selected based on the output voltage. One of switches is held on during the calculated on time. After the on time elapses, the other switch is held on until the currents flowing through the respective windings of the transformer is reduced to zero.

When the above described driving method is adopted, a driving frequency, which is the driving cycle during which two switches are alternately turned on, varies depending on a driving mode. However, since currents flowing through the respective windings of the transformer can be restored to zero at every driving cycle, a turn-on loss can be prevented from occurring when one of switches is first turned on during the next driving cycle and the responsiveness of control can be improved.

Even when a command voltage is continuously varied in the form of a sine wave in order to produce an alternating voltage, an output voltage can be successfully controlled in line with the command voltage. The driving method is suitable for a case where the power conversion circuit is used for motor control or the like for which a sine-wave output voltage is required.

When the power conversion circuit is driven in the current boundary mode, the first to fourth voltages to be used to switch the driving modes may be determined. Specifically, the first voltage V1 serving as a switching voltage for switching of the first driving mode and second driving mode is set to a voltage value that is approximately $(1+\sqrt{5})/2$ times larger than the supply voltage Vin. The second voltage V2 serving as a switching voltage for switching of the second driving mode and third driving mode is set to a voltage value that is approximately $(-1+\sqrt{5})/2$ times larger than the supply voltage Vin. The third voltage V3 serving as a switching voltage for switching of the third driving mode and fourth driving mode is set to a voltage value that is approximately $(3-\sqrt{5})/2$ times larger than the supply voltage Vin. The fourth voltage V4 serving as a switching voltage for switching of the fourth driving mode and fifth driving mode is set to a voltage value that is $(1-\sqrt{5})/2$ times larger than the supply voltage Vin.

The voltage values of the switching voltages or the first to fourth voltages V1 to V4 are each obtained by measuring the relationship between the output voltage Vout, which is provided when the power conversion circuit is operated in each of the driving modes, and a driving frequency, and selecting an output-voltage range for each of the driving modes according to the result of the measurement so that the driving frequency for the power conversion circuit will be maximized. Consequently, the power conversion circuit is driven in the current boundary mode, and the output voltage Vout is controlled over a wide range from a negative voltage to a positive voltage higher than the supply voltage Vin. The power conversion circuit can be controlled at the highest driving frequency, and the output voltage can be controlled into a command voltage with higher responsiveness.

A drive unit that drives the above described power conversion circuit controls an output voltage of the power conversion circuit into an externally fed command voltage. A driving mode selection means selects any of the above described driving modes as the driving mode for the power conversion circuit on the basis of the output voltage detected by a voltage detection means. A ratio arithmetic means computes a ratio between on times, during which two switches are alternately held on in each of the driving modes, on the basis of the detected output voltage and the externally fed command voltage. A drive means alternately turns on two switches used in a driving mode selected by the driving mode selection means according to the ratio calculated by the ratio arithmetic means during each certain driving cycle. The power conversion circuit can accordingly be driven and the output voltage of the power conversion circuit can be controlled over a wide range from a negative voltage to a positive voltage higher than a supply voltage.

A driving mode selection means selects any of the above described driving modes as the driving mode for the power conversion circuit on the basis of the output voltage detected by a voltage detection means. An on-time calculation means calculates an on time of a switch needed to control the output voltage into the command voltage. The on time is calculated on the basis of the output voltage, the command voltage, and a load current for each driving cycle of two switches employed in the driving mode selected by the driving mode selection means. A drive means holds one of the two switches employed in the driving mode selected by the driving mode selection means in an on state during the calculated on time. After the on time elapses, the other of the two switches is held on until currents flowing through the respective windings of a transformer become zero. The power conversion circuit can accordingly be driven in the current boundary mode. Therefore, with respect to the drive unit, not only the output voltage of the power conversion circuit can be controlled over a wide range from a negative voltage to a positive voltage higher than a supply voltage but also a turn-on loss can be prevented from occurring during every driving cycle of the power conversion circuit.

BRIEF DESCRIPTION OF THE DRAWINGS

Other objects, features and characteristics of the present invention will be appreciated and become apparent to those of ordinary skill in the art and all of which form a part of the present application. In the drawings.

DETAILED DESCRIPTION OF EXEMPLARY EMBODIMENTS

Embodiments to which the present invention is applied will be described below in conjunction with the drawings.

First Embodiment

Figure 1:
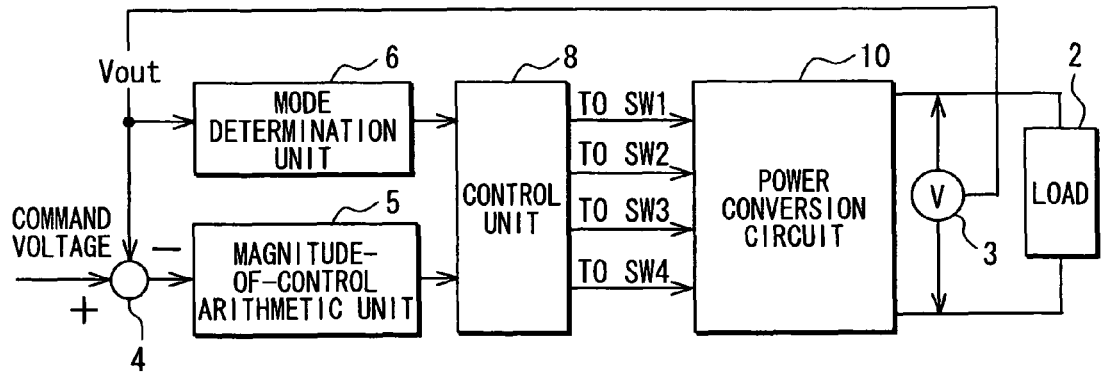
FIG. 1 is a block diagram illustrating an exemplary configuration of a power conversion device of a first embodiment.

A configuration of an exemplary power conversion device of a first embodiment to which the present invention is applied is shown in the block diagram FIG. 1. The power conversion device of the present embodiment includes a power conversion circuit 10, which is shown in greater detail in FIG. 2, that operates the power conversion circuit 10 as a DC-DC converter of a step-up type, a step-up-and-down type, a step-down type, an inverted-output step-up-and-down type, or an inverted-output step-up type. The power conversion circuit 10 thus produces an output voltage Vout within a voltage range from a negative voltage that is lower than a ground voltage of 0V to a positive voltage that is higher than the ground voltage of 0V and higher than a supply voltage Vin of a direct-current (DC) power supply 20. The output voltage to a load 2 is supplied with a reference potential being the potential on a negative electrode side of the DC power supply 20, for example, as shown in FIG. 2.

Figure 2:
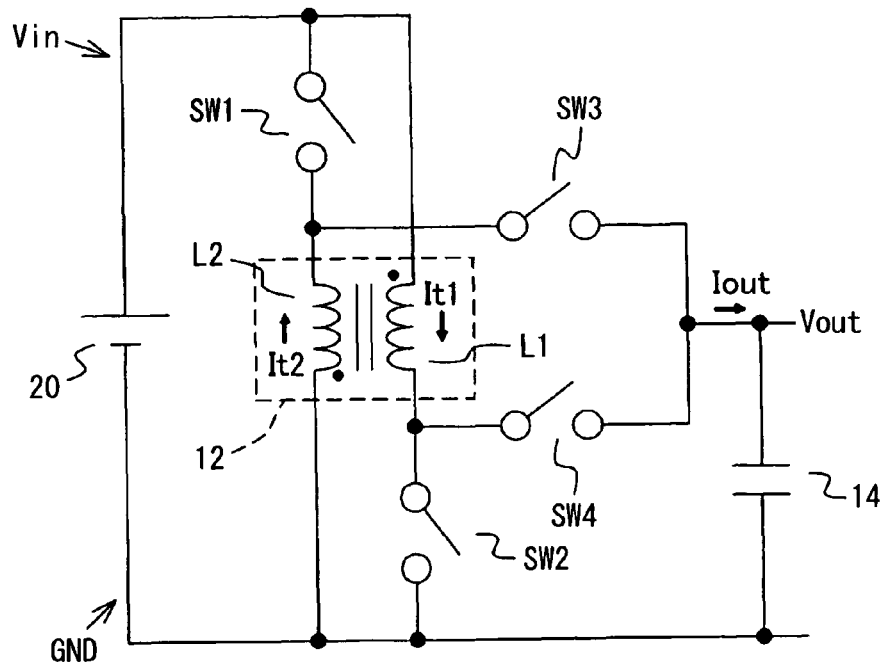
FIG. 2 is a circuit diagram illustrating exemplary circuitry of a power conversion circuit of an embodiment.

The power conversion circuit 10 includes, as shown in FIG. 2, a transformer 12 having a ratio between the numbers of turns of a primary winding L1 and a secondary winding L2 set to 1:1. The primary winding L1 of the transformer 12 has one terminal directly connected to the positive electrode side of the DC power supply 20, and has the other terminal connected to the negative electrode side of the DC power supply 20, that is, a ground GND via a second switch SW2.

One terminal of the secondary winding L2 of the transformer 12 is directly connected to the negative electrode side of the DC power supply 20, that is, the ground GND so that the phase in the secondary winding will be opposite to that in the primary winding L1. The other terminal of the secondary winding L2 is connected to the positive electrode side of the DC power supply 20 via a first switch SW1.

The power conversion circuit 10 includes a voltage outputting capacitor 14 having one terminal grounded to the ground GND. The other terminal of the capacitor 14 is connected to a node between the secondary winding L2 and the first switch SW1 via a third switch SW3, and also connected to a node between the primary winding L1 and second switch SW2 via a fourth switch SW4. It should be noted that the first switch SW1 to fourth switch SW4 are realized with bidirectional switches capable of bi-directionally conducting or cutting off a current.

Figure 3A:
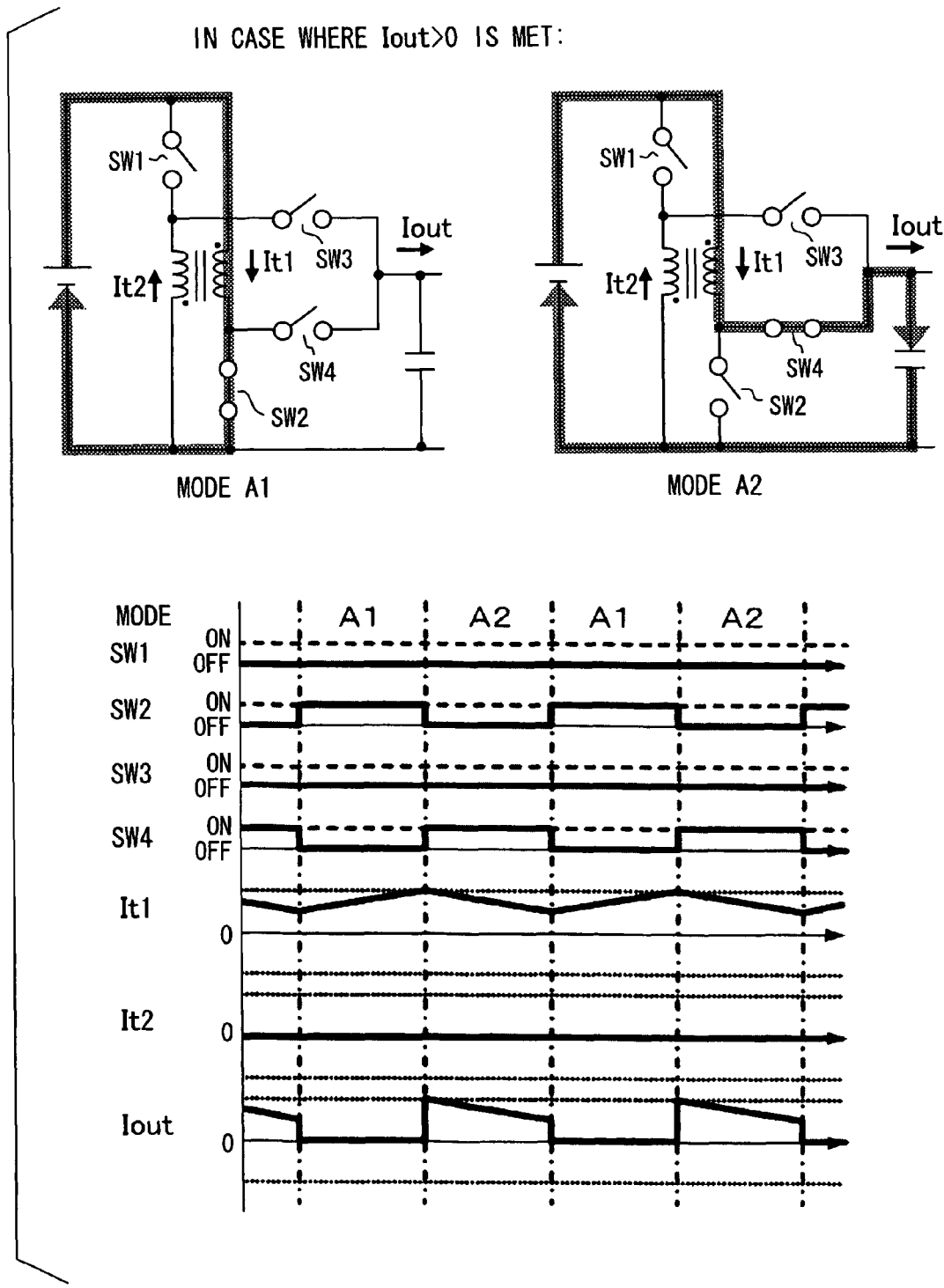
FIGS. 3A and 3B are diagrams illustrating a current variation occurring when the power conversion circuit is operated in an exemplary operating mode A.
Figure 3B:
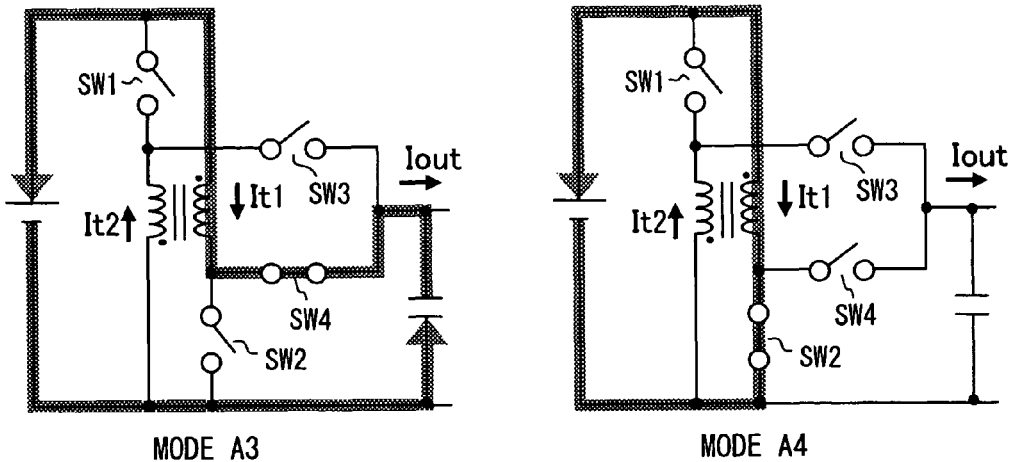
Figure 3B:
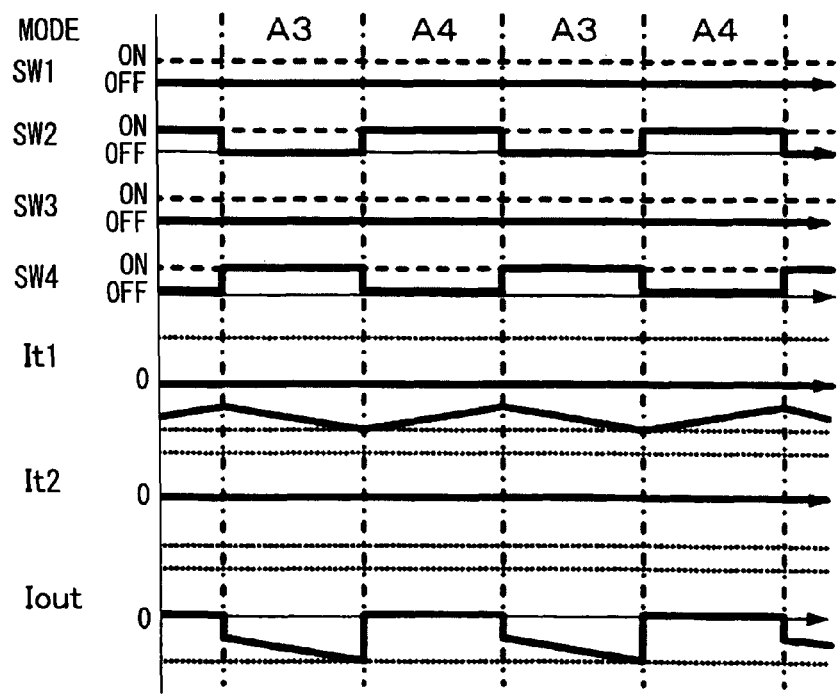

In the power conversion circuit 10 of the present embodiment having the foregoing circuitry, when the second switch SW2 and fourth switch SW4 are alternately turned on with the first switch SW1 and third switch SW3 held in an off state, a current It1 flows, as shown in FIGS. 3A and 3B, through the primary winding L1. The power conversion circuit can thus be operated, for example in a step-up mode A, as a step-up DC-DC converter capable of producing an output voltage Vout higher than the supply voltage Vin, that is, an output voltage Vout which meets Vout>Vin.

Figure 4A:
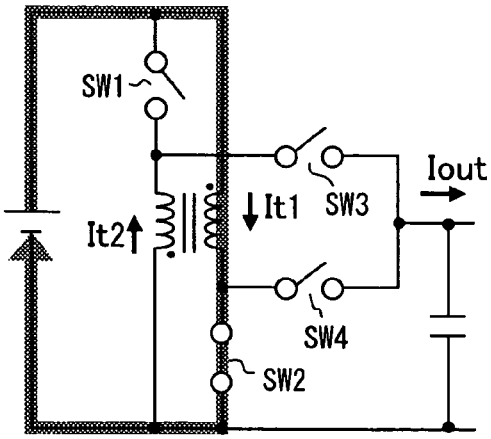
FIGS. 4A and 4B are diagrams illustrating a current variation occurring when the power conversion circuit is operated in an exemplary operating mode B.
Figure 4A:
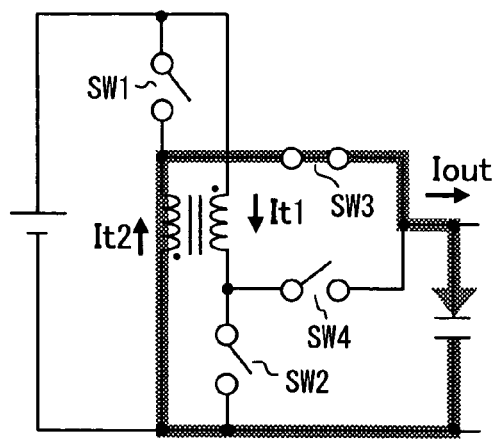
Figure 4A:
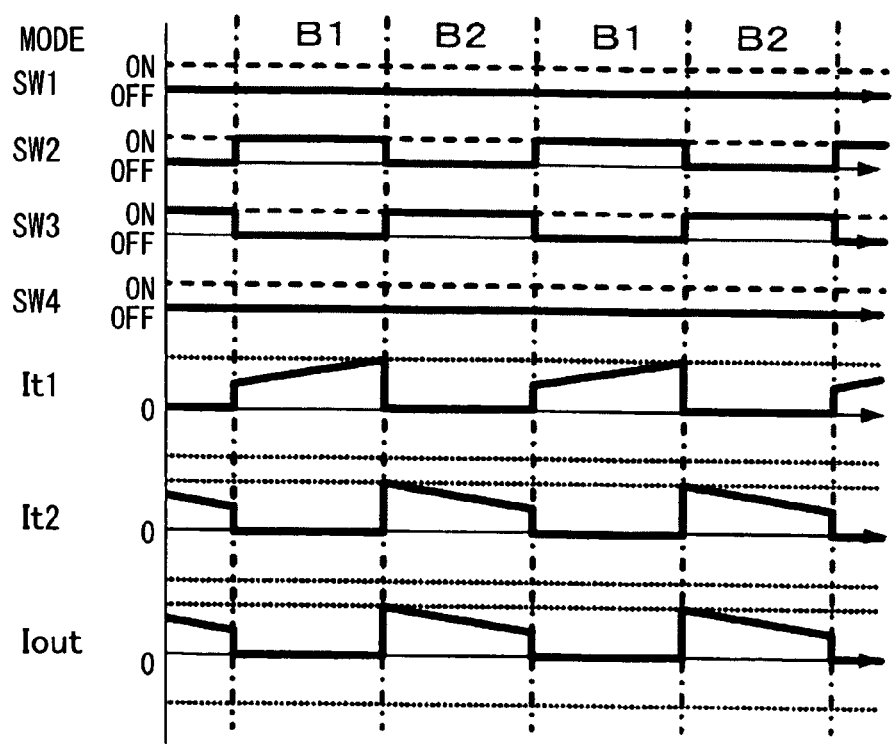
Figure 4B:
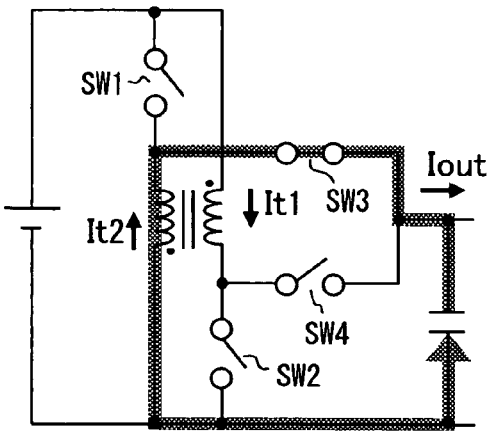
Figure 4B:
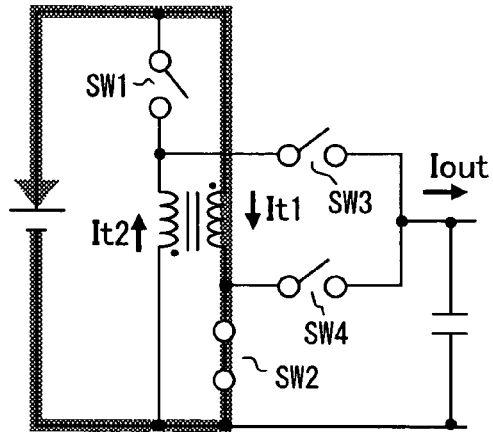
Figure 4B:
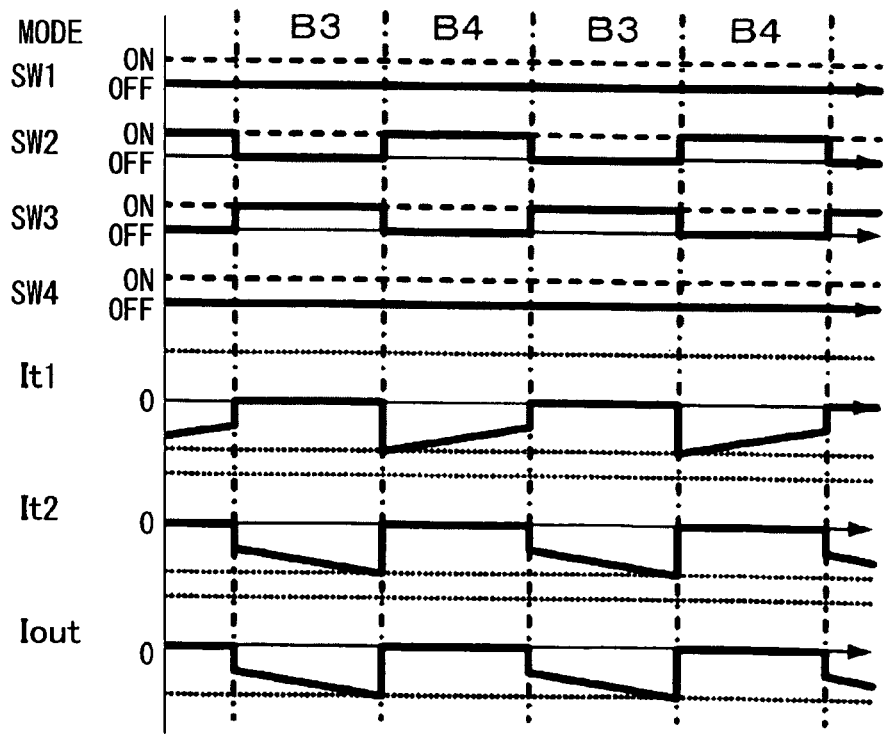

When the second switch SW2 and third switch SW3 are alternately turned on with the first switch SW1 and fourth switch SW4 held in the off state, currents It1 and It2 flow, as shown in FIGS. 4A and 4B, through the primary winding L1 and secondary winding L2 respectively. The power conversion circuit 10 can thus be operated, for example in a step-up-and-down mode B, as a step-up-and-down DC-DC converter capable of producing an output voltage Vout higher than the ground voltage of 0V, that is, an output voltage Vout which meets Vout>0.

Figure 5A:
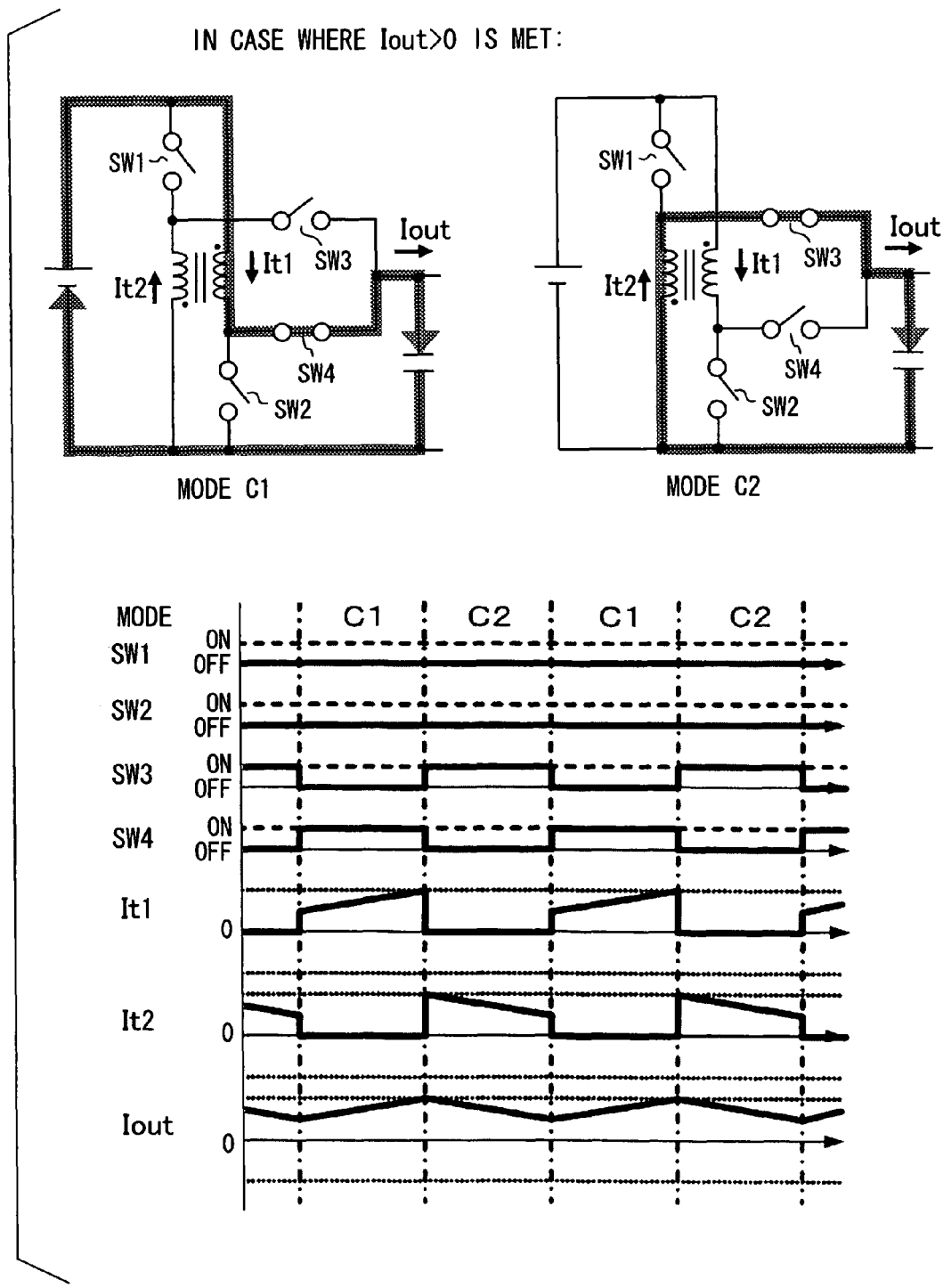
FIGS. 5A and 5B are diagrams illustrating a current variation occurring when the power conversion circuit is operated in an exemplary operating mode C.
Figure 5B:
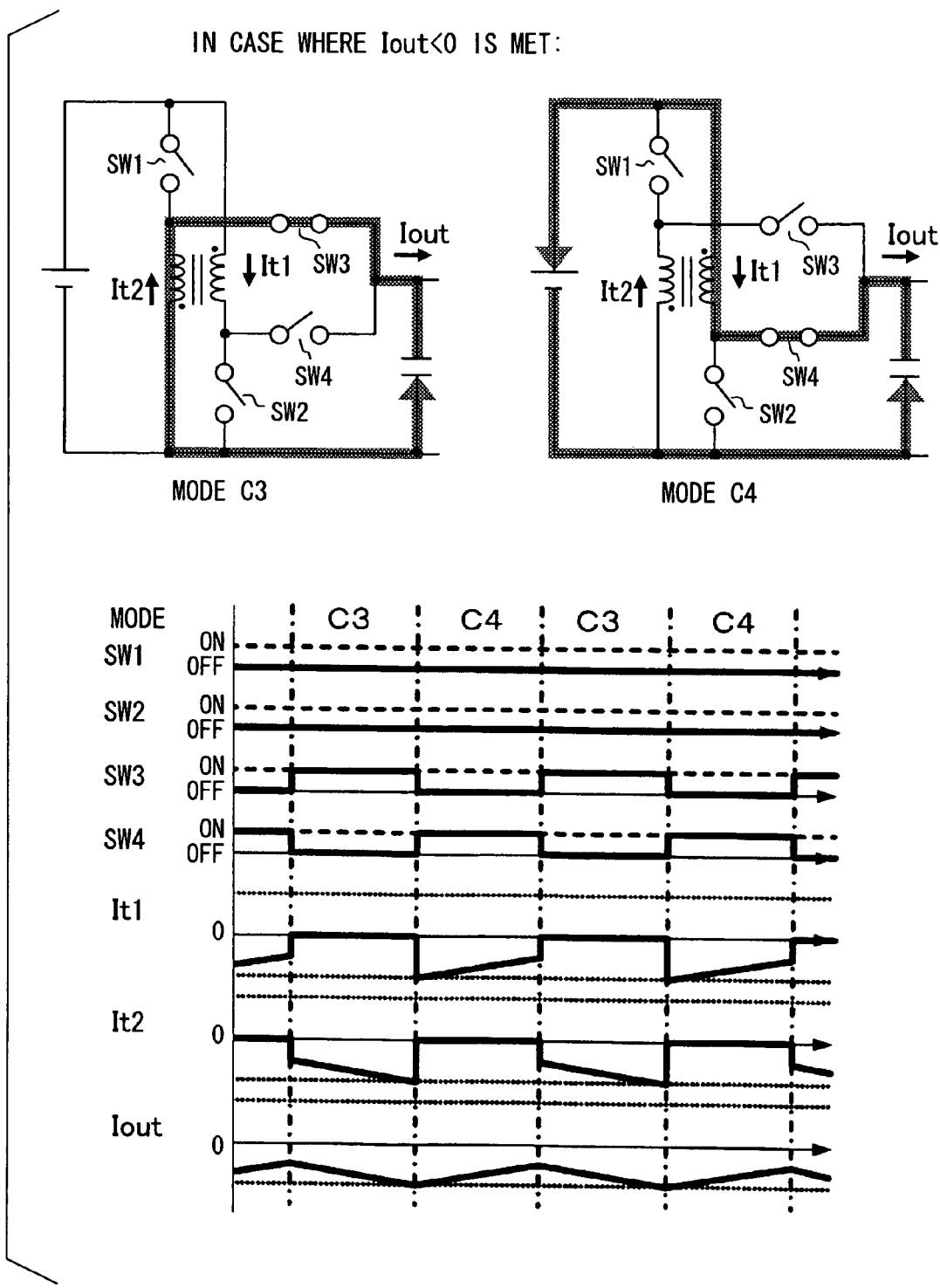

When the fourth switch SW4 and third switch SW3 are alternately turned on with the first switch SW1 and second switch SW2 held in the off state, the currents It1 and It2 flow, as shown in FIGS. 5A and 5B, through the primary winding L1 and secondary winding L2 respectively. The power conversion circuit 10 can thus be operated, for example in a step-down mode C, as a step-down DC-DC converter capable of producing a positive output voltage Vout lower than the supply voltage Vin, that is, a positive output voltage Vout which meets Vin>Vout>0.

Figure 6A:
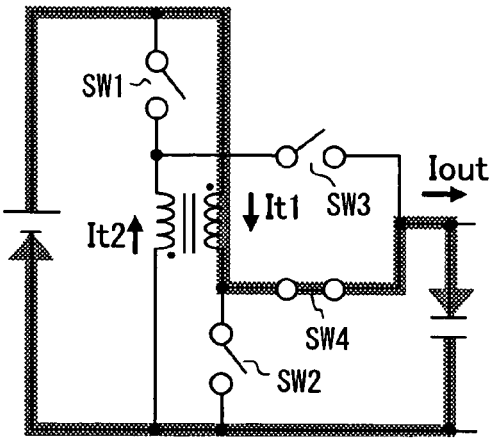
FIGS. 6A and 6B are diagrams illustrating a current variation occurring when the power conversion circuit is operated in an exemplary operating mode D.
Figure 6A:
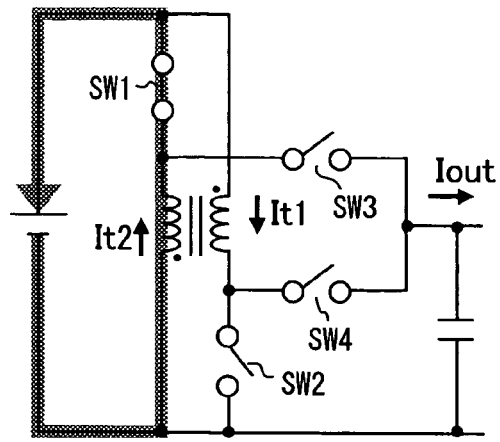
Figure 6A:
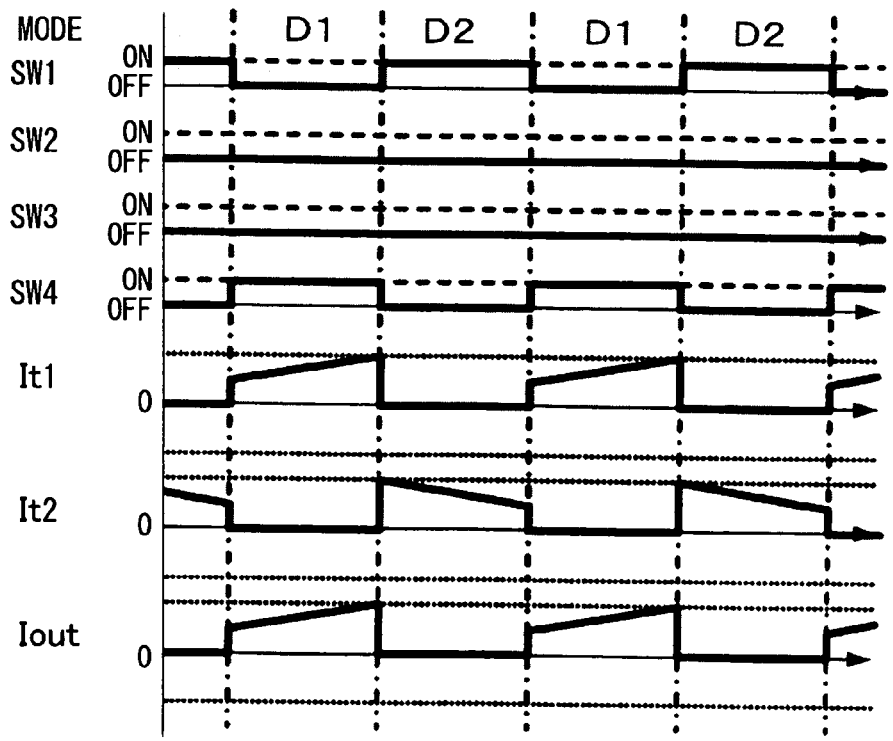
Figure 6B:
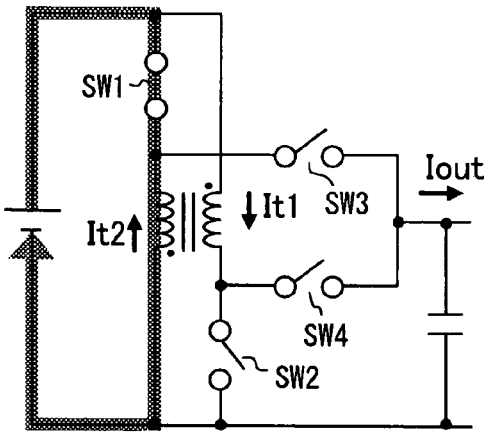
Figure 6B:
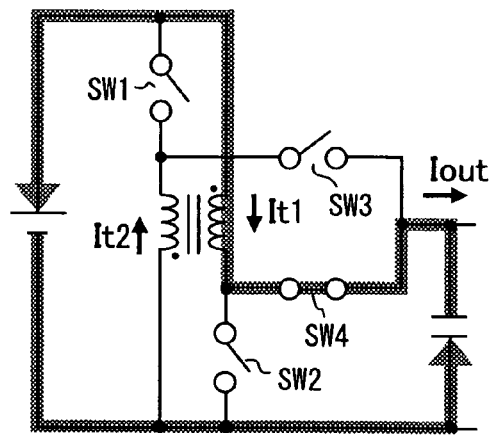
Figure 6B:
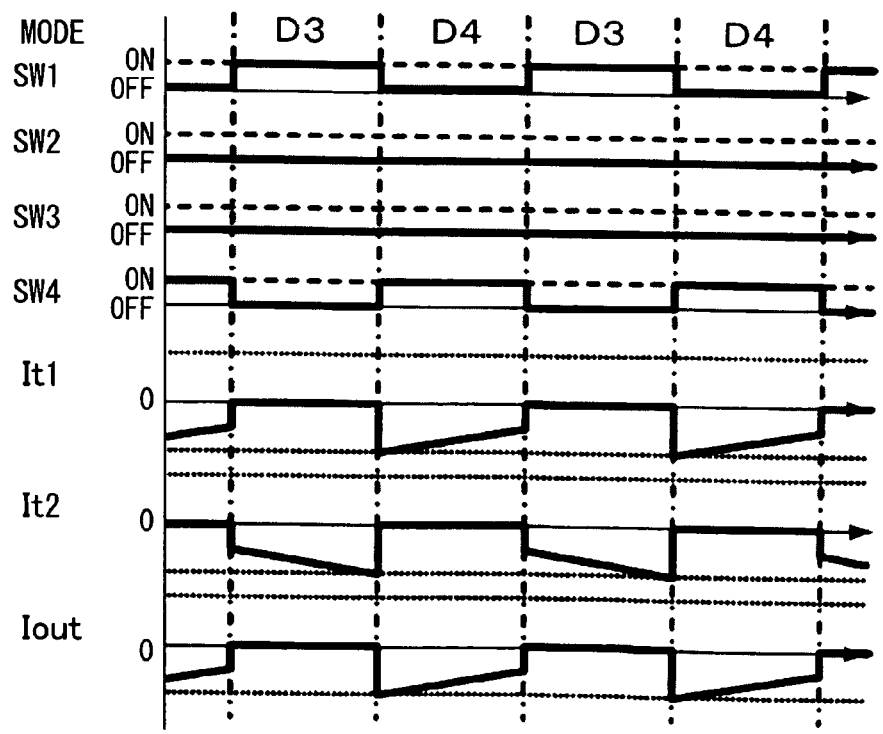

When the fourth switch SW4 and first switch SW1 are alternately turned on with the second switch SW2 and third switch SW3 held in the off state, the currents It1 and It2 flow, as shown in FIGS. 6A and 6B, through the primary winding L1 and secondary winding L2 respectively. The power conversion circuit 10 can thus be operated as, for example in an inverted-output step-up-and-down mode D, an inverted-output step-up-and-down DC-DC converter capable of producing an output voltage Vout lower than the supply voltage Vin, that is, an output voltage Vout which meets Vout<Vin.

Figure 7A:
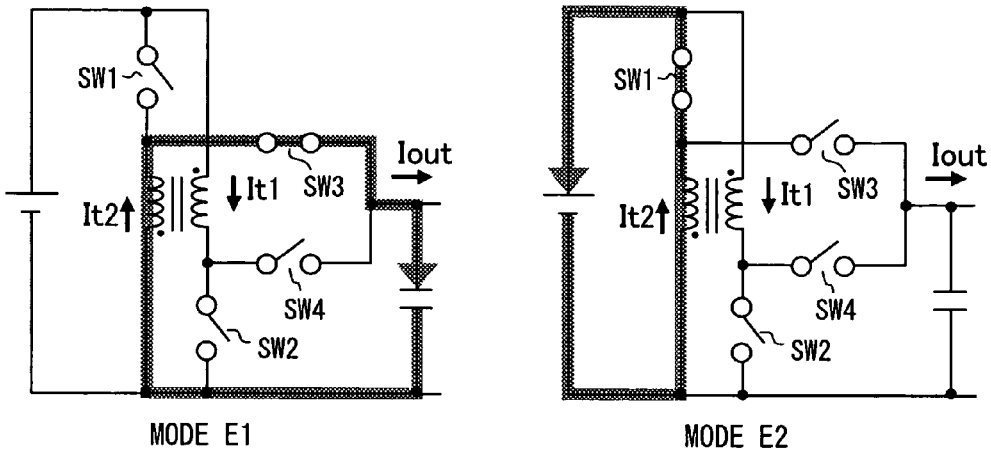
FIGS. 7A and 7B are diagrams illustrating a current variation occurring when the power conversion circuit is operated in an exemplary operating mode E.
Figure 7A:
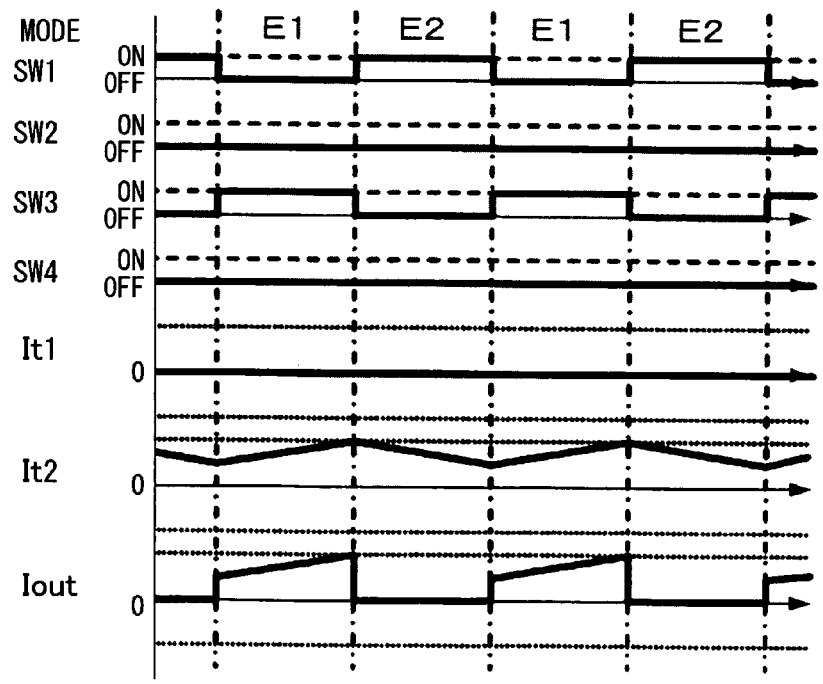
Figure 7B:
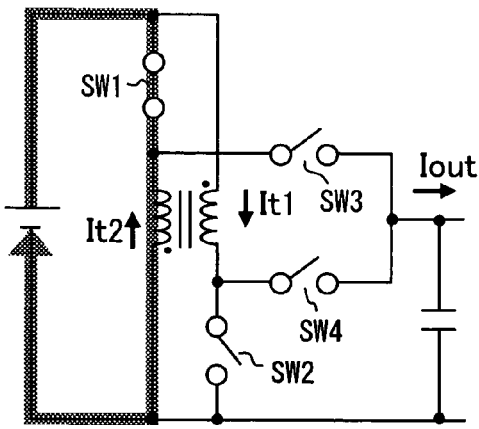
Figure 7B:
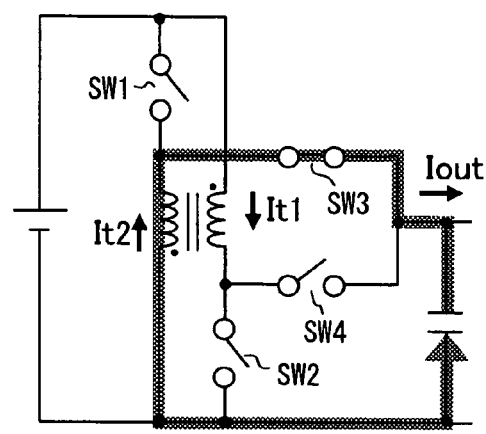
Figure 7B:
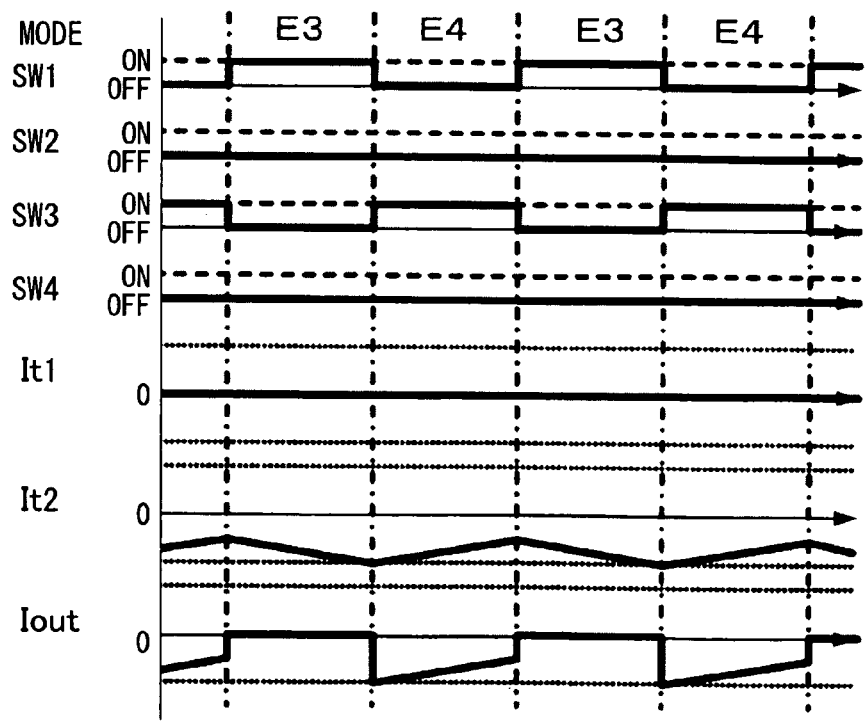

When the third switch SW3 and first switch SW1 are alternately turned on with the second switch SW2 and fourth switch SW4 held in the off state, the current It2 flows, as shown in FIGS. 7A and 7B, through the secondary winding L2. The power conversion circuit 10 can thus be operated, for example in an inverted-output step-up mode E, as an inverted-output step-up DC-DC converter capable of producing a negative output voltage Vout lower than the ground voltage of 0V, that is, a negative output voltage Vout which meets Vout<0.

FIG. 3A to FIG. 7B show the relationship among the currents It1 and It2 that flow through the respective windings L1 and L2 of the transformer 12 when the power conversion circuit 10 is operated in each of the operating modes A to E, and the load current Iout that flows from the power conversion circuit 10 into the load 2. In the drawings, among numerals 1 to 4 appended to the identification symbols A to E of the operating modes, numerals 1 and 2 contained in A1 and A2 to E1 and E2 signify the operations to be performed when the load current Iout is a positive current flowing from the power conversion circuit 10 to the load 2 side, that is, when Iout>0 is met. Numerals 3 and 4 contained in A3 and A4 to E3 and E4 signify the operations to be performed when the load current Iout is a negative current flowing from the load 2 to the power conversion circuit 10 side, that is, when Iout<0 is met.

According to the power conversion circuit 10 of the present embodiment, when the operating mode is switched to any of a step-up mode A, a step-up-and-down mode B, a step-down mode C, an inverted-output step-up-and-down mode D, and an inverted-output step-up mode E, the output voltage Vout can be varied over a wide range from a negative voltage lower than the ground voltage of 0V to a positive voltage higher than the supply voltage Vin.

The power conversion device of the present embodiment includes, as shown in FIG. 1, a voltage detection circuit 3 that detects an output voltage Vout fed from the power conversion circuit 10 to the load 2, a deviation arithmetic unit 4 that calculates a deviation of the output voltage Vout, which is detected by the voltage detection circuit 3, from an externally inputted command voltage. The power conversion device further includes a magnitude-of-control arithmetic unit 5 that calculates a magnitude of control in the power conversion circuit 10, or in the present embodiment, a switching ratio needed to make the deviation zero on the basis of the deviation calculated by the deviation arithmetic unit 4, an integral value of the deviation, and a predetermined proportional constant and integration constant. The power conversion device further includes a mode determination unit 6 that determines based on the output voltage Vout detected by the voltage detection circuit 3 in which of the above described five operating modes A to E the power conversion circuit 10 should be driven. The power conversion device still further includes a control unit 8 that controls the power conversion circuit 10 on the basis of the driving mode determined by the mode determination unit 6 and the magnitude of control calculated by the magnitude-of-control arithmetic unit 5.

Herein, the mode determination unit 6 compares the output voltage Vout with determinant voltages V1 to V4, which are predetermined for mode determination, so as to determine in which of the five operating modes A to E the power conversion circuit 10 should be operated, and commands the control unit 8 to drive the power conversion circuit 10 in a driving mode corresponding the operating mode. The determinant voltages V1 to V4 for mode determination are, for example, designated as shown in FIG. 8.

Figure 8:
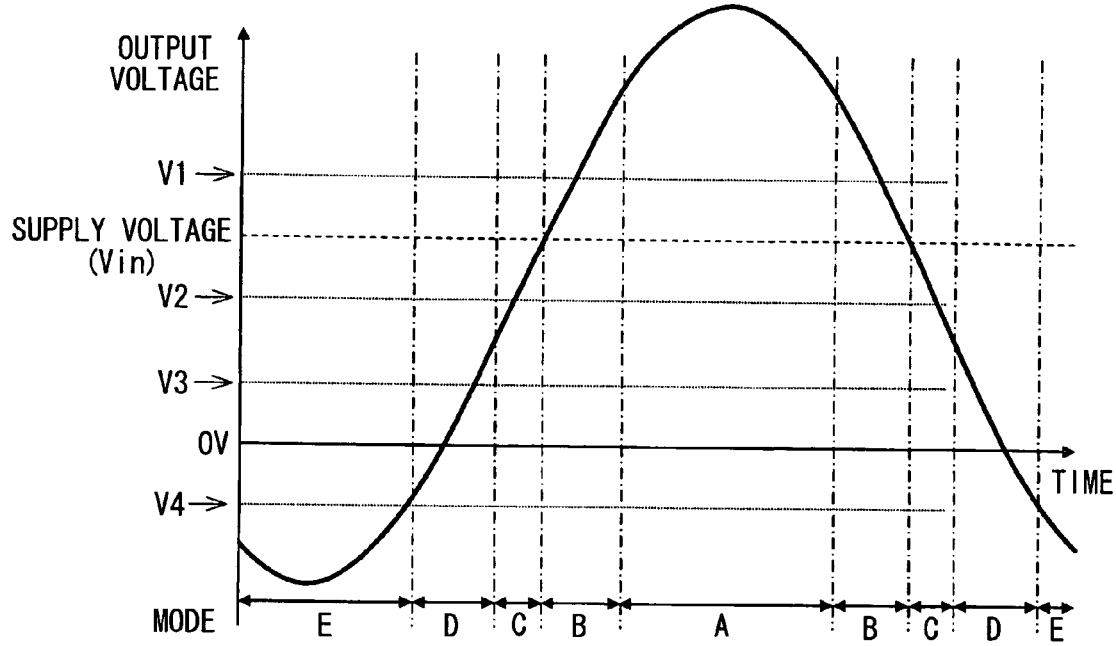
FIG. 8 is a diagram illustrating exemplary relationships among an output voltage, determinant voltages, and operating modes.

Specifically, FIG. 8 shows the relationship among the output voltage Vout that is fed from the power conversion circuit 10 and varied in the form of a sine wave, the determinant voltages V1 to V4, and the operating modes of the power conversion circuit 10. As shown, a voltage value larger than the supply voltage Vin is designated as the determinant voltage V1. A voltage value close to the supply voltage Vin between the ground voltage of 0V and supply voltage Vin is designated as the determinant voltage V2. A voltage value close to the ground voltage of 0V between the ground voltage of 0V and supply voltage Vin, or in other words, a voltage lower than the determinant voltage V2 is designated as the determinant voltage V3. A voltage value that is smaller than the ground voltage of 0V is designated as the determinant voltage V4.

When the output voltage Vout is equal to or higher than the determinant voltage V1, that is, when the condition Vout>V1 is met, the mode determination unit 6 selects a driving mode in which the power conversion circuit 10 is operated in the step-up mode A. When the output voltage Vout is at an intermediate value between the determinant voltage V2 and determinant voltage V1, that is, when the condition V2≦Vout<V1 is met, the mode determination unit 6 selects a driving mode in which the power conversion circuit 10 is operated in the step-up-and-down mode B. When the output voltage Vout is at an intermediate value between the determinant voltage V3 and determinant voltage V2, that is, when the condition V3≦Vout<V2 is met, the mode determination unit 6 selects a driving mode in which the power conversion circuit 10 is operated in the step-down mode C. When the output voltage Vout is at an intermediate value between the determinant voltage V4 and determinant voltage V3, that is, when the condition V4≦Vout<V3 is met, the mode determination unit 6 selects a driving mode in which the power conversion circuit 10 is operated in the inverted-output step-up-and-down mode D. When the output voltage Vout falls below the determinant voltage V4, that is, when the condition Vout<V4 is met, the mode determination unit 6 selects a driving mode in which the power conversion circuit 10 is operated in the inverted-output step-up mode E.

The control unit 8 selects two switches, which are alternately turned on at the time of driving the power conversion circuit, on the basis of the driving mode commanded by the mode determination unit 6, produces a PWM signal with which the two switches are alternately turned on during each certain driving cycle, on the basis of the magnitude of control calculated by the magnitude-of-control arithmetic unit 5, that is, a switching ratio, and outputs the PWM signal to the power conversion circuit 10 so as to drive the power conversion circuit 10.

As a result, according to the power conversion device of the present embodiment, the output voltage Vout from the power conversion circuit 10 can be varied over a wide range from a negative voltage lower than the ground voltage of 0V to a positive voltage higher than the supply voltage Vin according to an externally inputted command voltage. The power conversion device can be used for production of an alternating voltage shown in FIG. 8.

In the present embodiment, the voltage detection circuit 3 can be used as an exemplary voltage detection means, the mode determination unit 6 can be used as an exemplary driving mode selection means, the magnitude-of-control arithmetic unit 5 can be used as an exemplary ratio arithmetic means, and the control unit 8 can be used as an exemplary drive means.

Figure 9A:
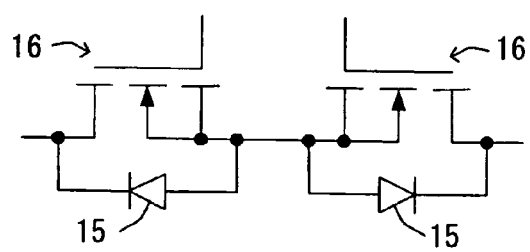
FIG. 9A is a circuit diagram illustrating an exemplary concrete example of switch circuitry in a power conversion circuit.
Figure 9B:
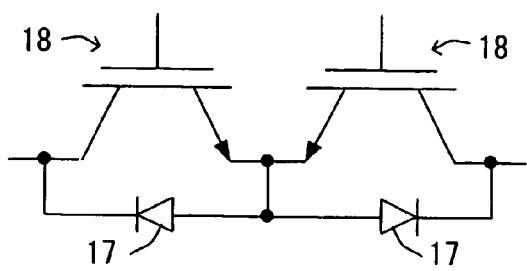
FIG. 9B is a circuit diagram illustrating another exemplary concrete example of switch circuitry in a power conversion circuit.
Figure 9C:
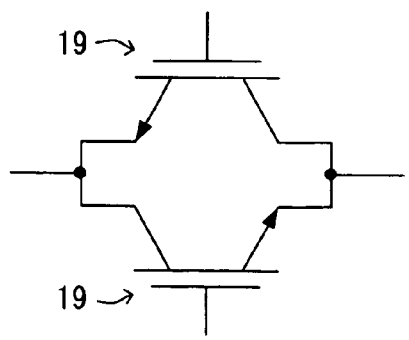
FIG. 9C is a circuit diagram illustrating still another exemplary concrete example of switch circuitry in a power conversion circuit.
Figure 10:
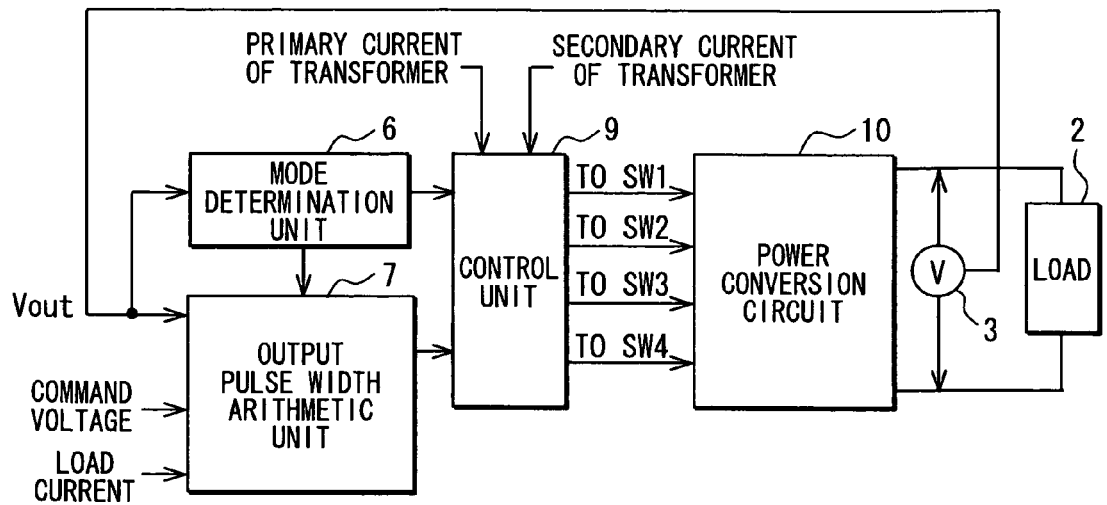
FIG. 10 is a block diagram illustrating an exemplary configuration of a power conversion device of a second embodiment.

Moreover, in the above description, the switches SW1 to SW4 are stated simply as bidirectional switches. An exemplary bidirectional switch construction, as shown in FIG. 9A, can include a pair of MOSFETs 16 including back-to-back diodes 15 connected to each other so that the back-to-back diodes 15 will be oriented in mutually opposite directions. Alternatively, an exemplary bidirectional switch construction, as shown in FIG. 9B, can include a pair of IGBTs 18 including back-to-back diodes 17 connected to each other so that the back-to-back diodes 17 will be oriented in mutually opposite directions. In recent years, a construction having, as shown in FIG. 9C, a pair of reverse-blocking IGBTs 19 connected inversely in parallel with each other has been known as a bidirectional switch causing a little power loss. This kind of bidirectional switch may be adopted as the switches SW1 to SW4.

Second Embodiment

Next, an exemplary configuration of a power conversion device in accordance with a second embodiment is described. The power conversion device of the present embodiment includes the power conversion circuit 10 shown in FIG. 2, and operates the power conversion circuit 10 as a DC-DC converter of a step-up type, a step-up-and-down type, a step-down type, an inverted-output step-up-and-down type, or an inverted-output step-up type so that an output voltage Vout can be regulated over a wide range from a negative voltage to a positive voltage.

The power conversion device of the present embodiment is essentially identical to the power conversion device of the first embodiment in that a voltage detection circuit 3 detects the output voltage Vout, a mode determination unit 6 designates a driving mode for the power conversion circuit 10 on the basis of the result of the detection, that is, an output voltage Vout, so that the power conversion circuit 10 will be set to any of the five operating modes A to E. However, a driving method for driving the power conversion circuit 10 in each of driving modes is different from that in the power conversion device of a first embodiment.

Specifically, in the power conversion device of a first embodiment, two switches to be employed in each of driving modes are alternately turned on within a certain driving cycle in order to control the output voltage Vout into a command voltage. According to such a driving method, when the driving cycle is switched to another, since currents flow through the respective windings of the transformer 12, a turn-on loss may occur at the time of turning on a switch during the next driving cycle.

The present embodiment adopts a driving method based on a so-called current boundary mode in which currents flowing through the respective windings of the transformer are restored to zero at every driving cycle, during which two switches are alternately turned on, in order to nullify the turn-on loss.

The configuration of the power conversion device of the present embodiment intended to implement the driving method will be described below.

To begin with, according to the driving method based on the current boundary mode, a driving cycle or driving frequency needed to control the output voltage Vout into a command voltage varies depending on the output voltage Vout. Moreover, the driving cycle or driving frequency differs among the operating modes A to E of the power conversion circuit 10.

Figure 11:
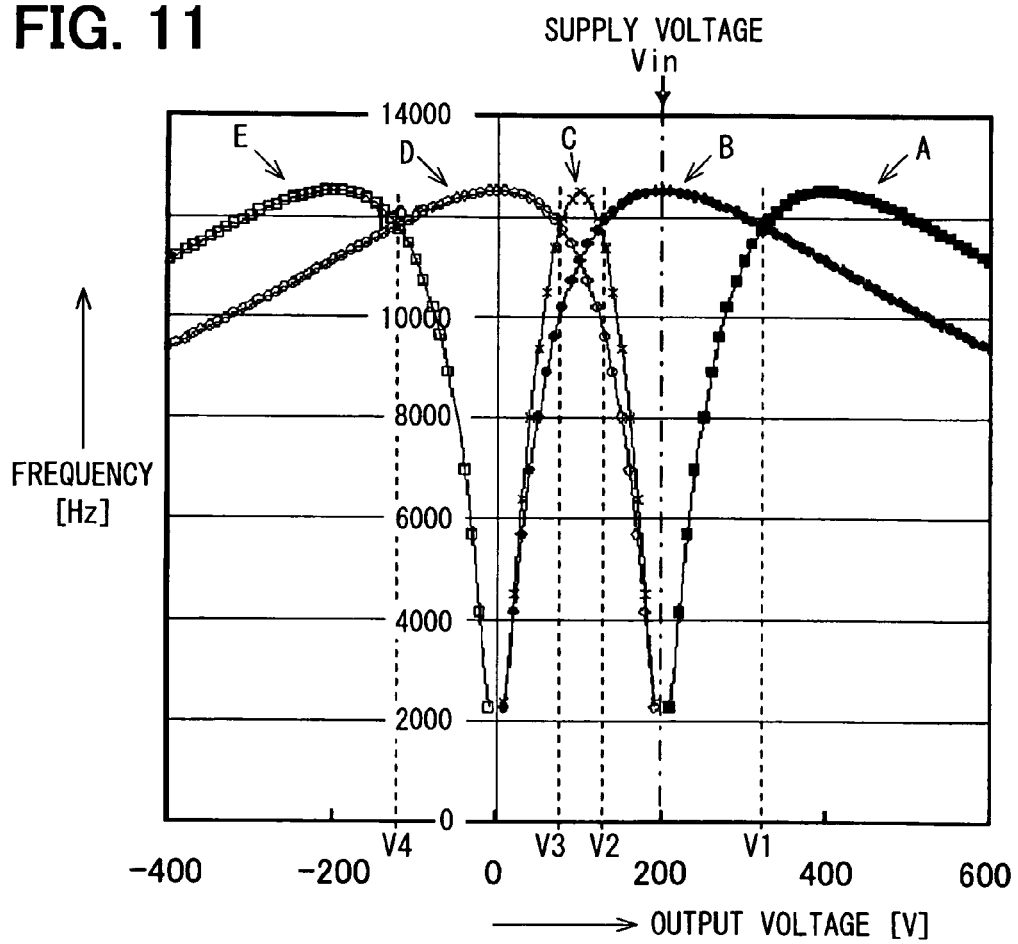
FIG. 11 is a diagram illustrating the results of measurement performed on the relationship between the output voltage of a power conversion circuit in a current boundary mode and a driving frequency.
Figure 12A:
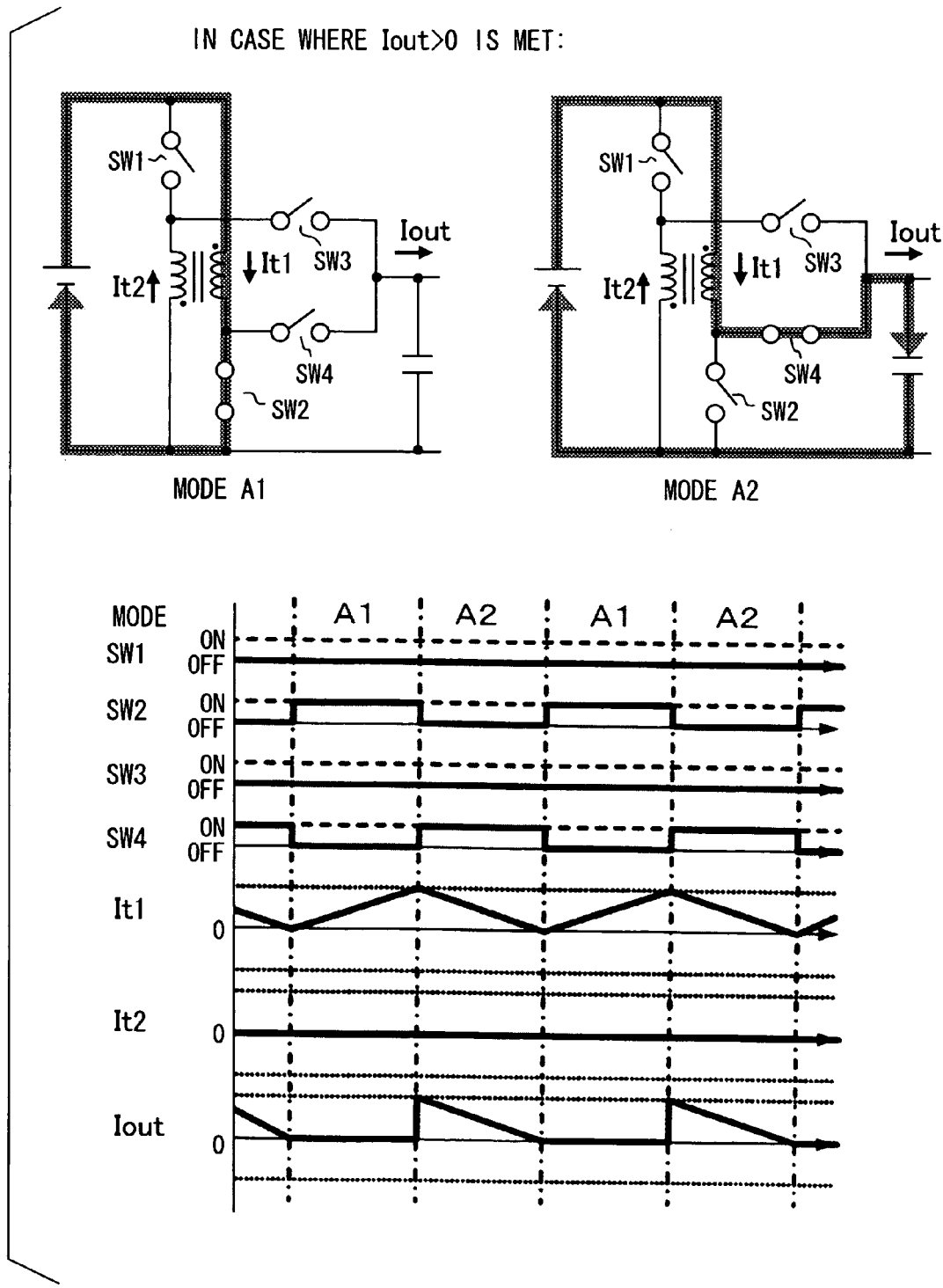
FIGS. 12A and 12B are diagrams illustrating a current variation in an operating mode A in the second embodiment.
Figure 12B:
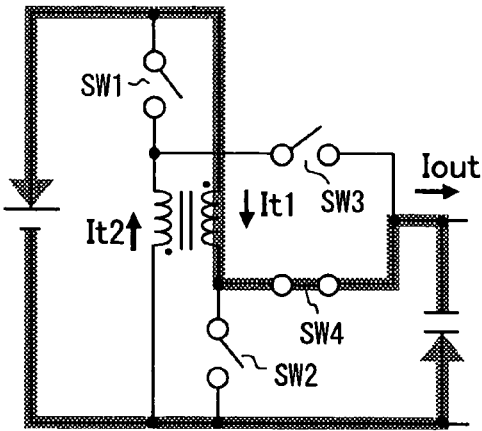
Figure 12B:
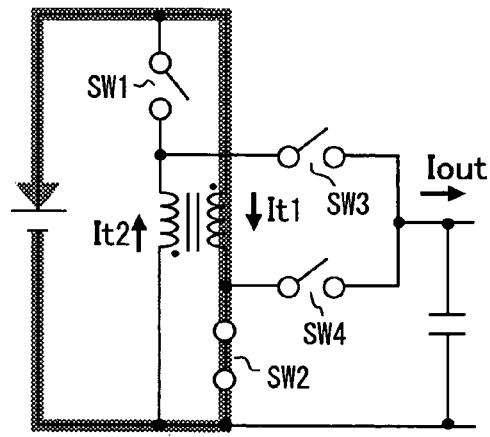
Figure 12B:
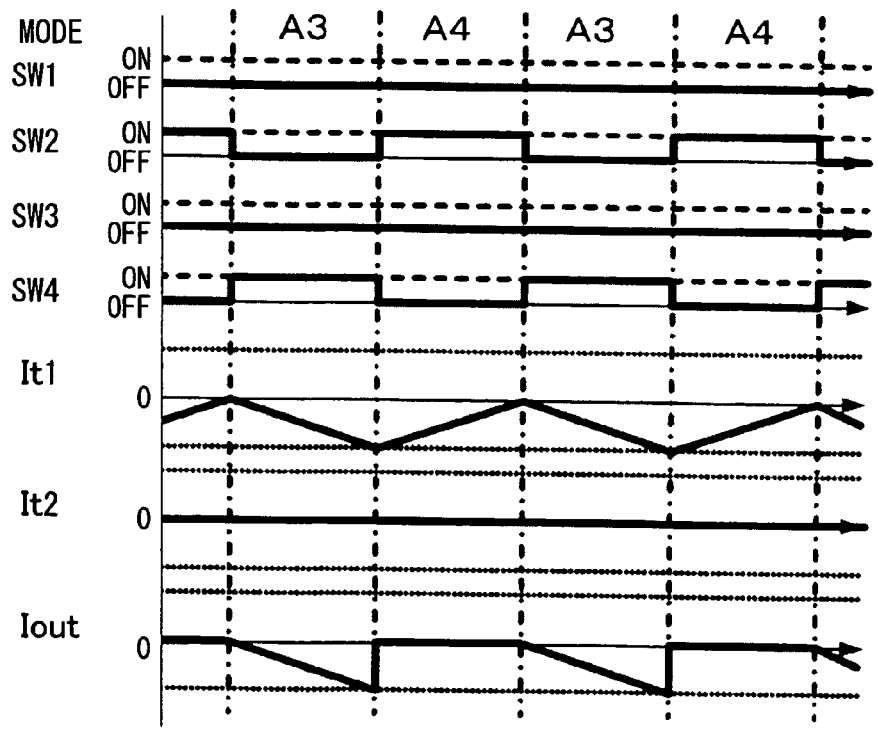
Figure 13A:
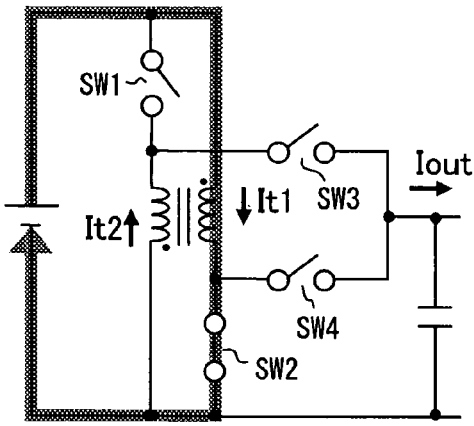
FIGS. 13A and 13B are diagrams illustrating a current variation in an operating mode B in the second embodiment.
Figure 13A:
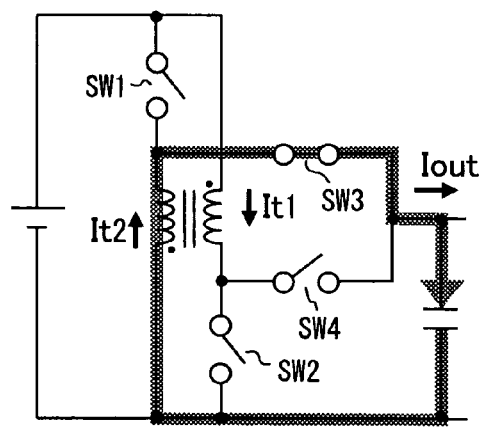
Figure 13A:
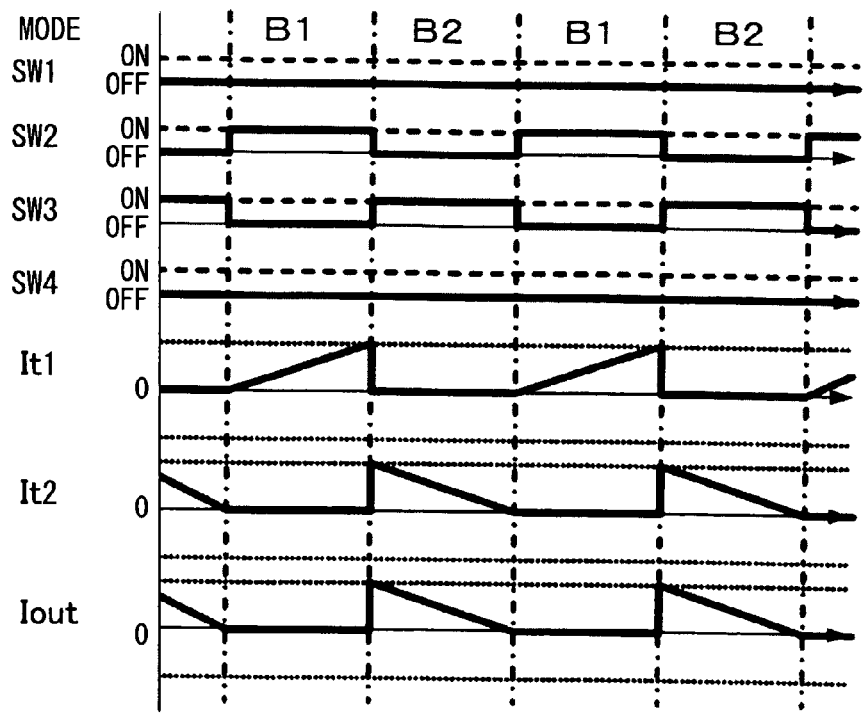
Figure 13B:
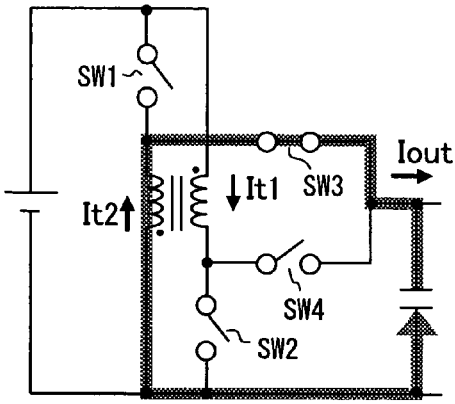
Figure 13B:
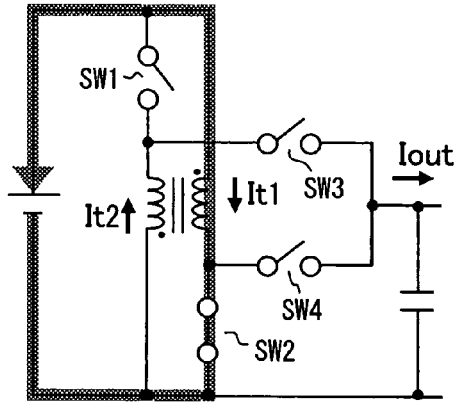
Figure 13B:
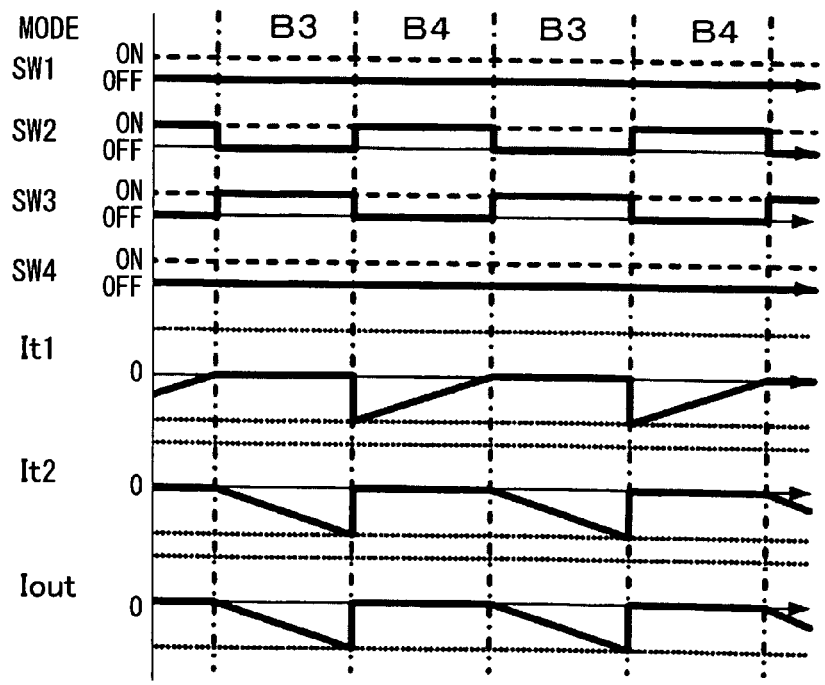
Figure 14A:
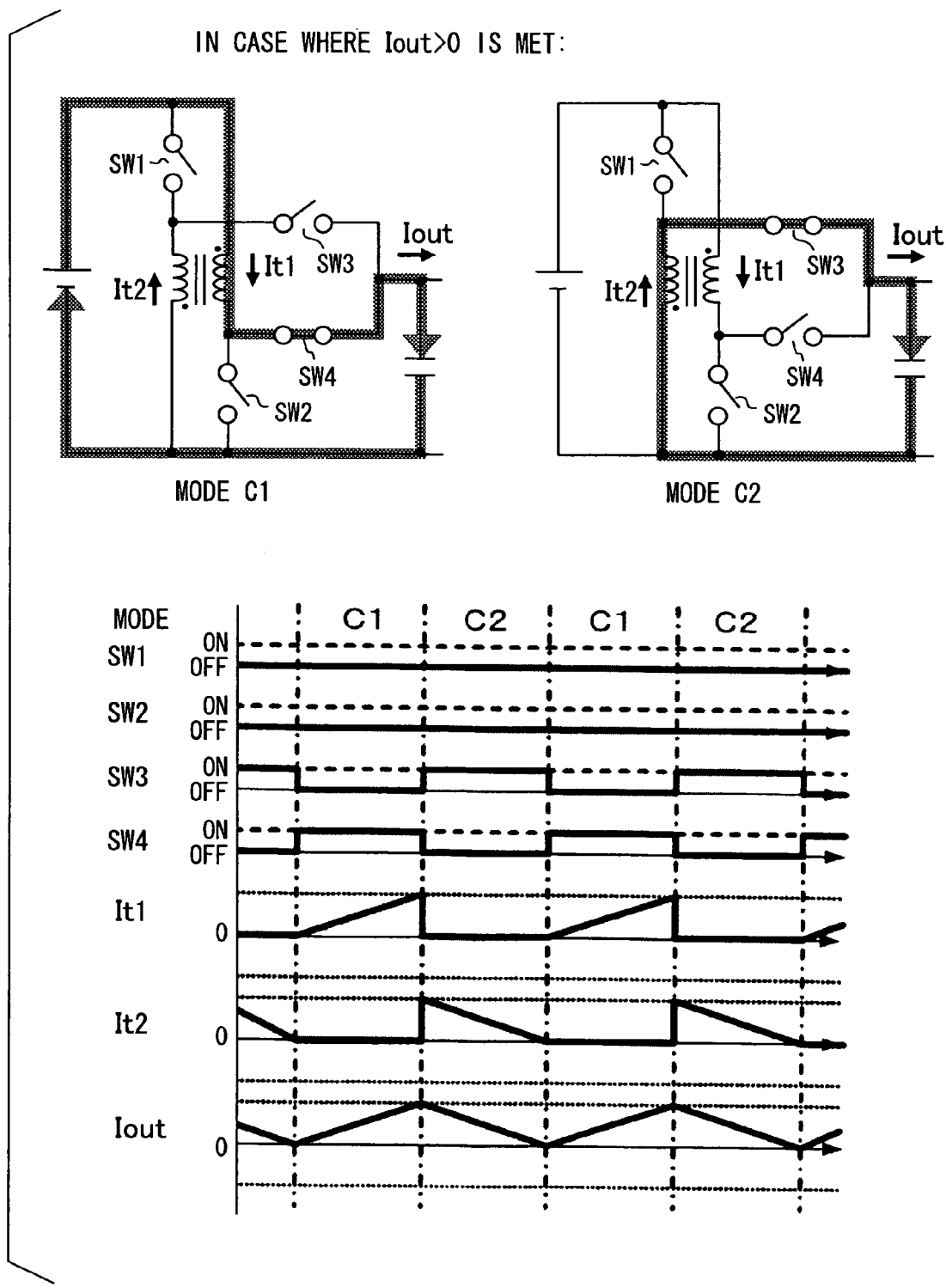
FIGS. 14A and 14B are diagrams illustrating a current variation in an operating mode C in the second embodiment.
Figure 14B:
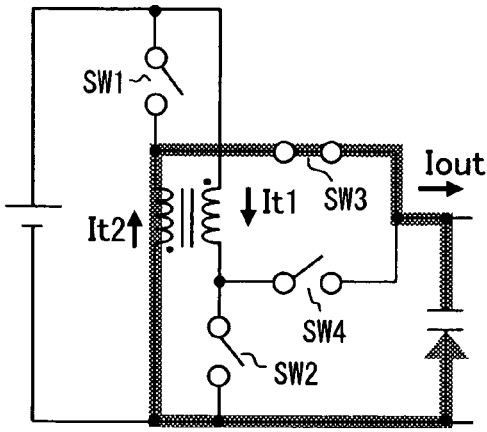
Figure 14B:
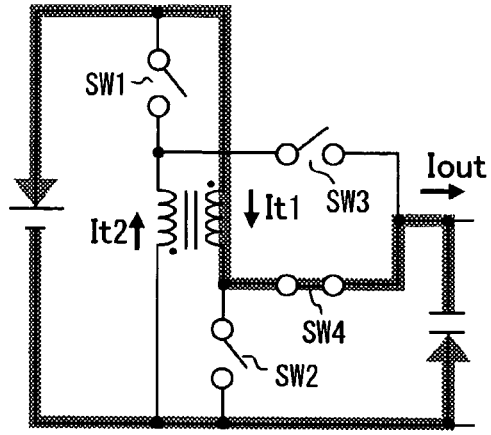
Figure 14B:
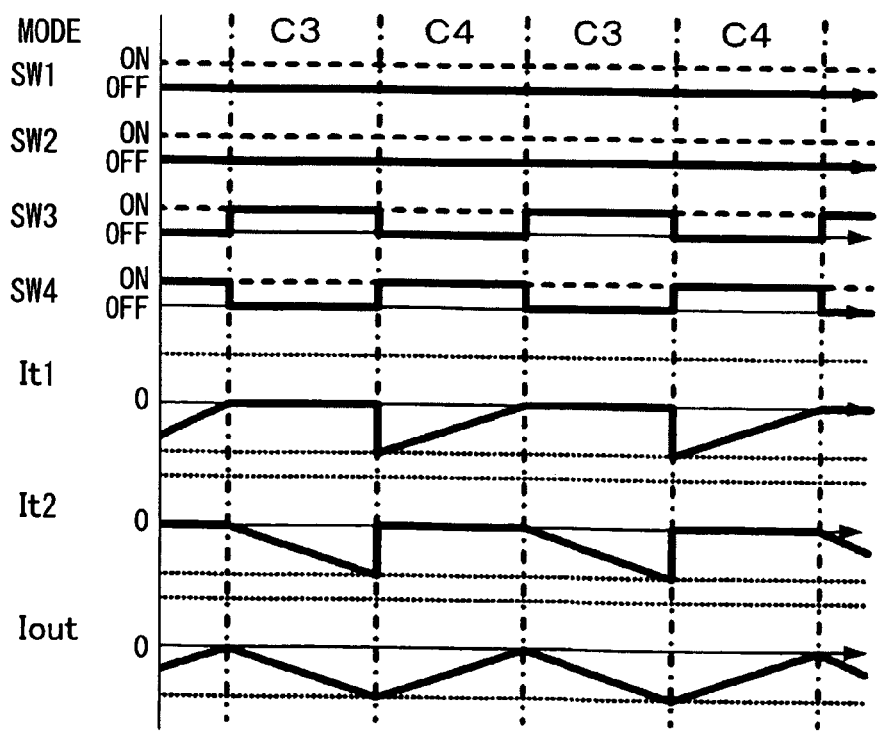
Figure 15A:
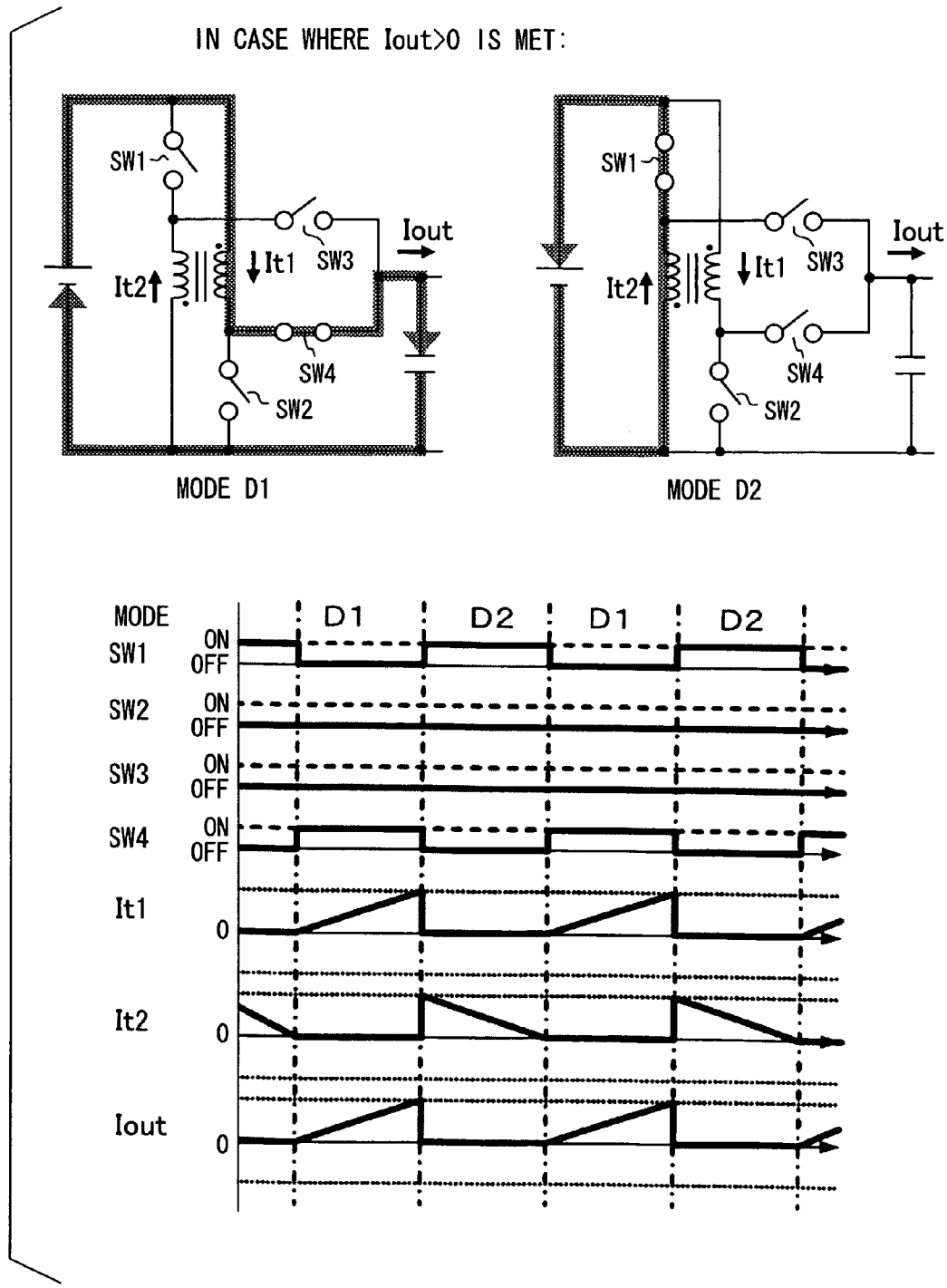
FIGS. 15A and 15B are diagrams illustrating a current variation in an operating mode D in the second embodiment.
Figure 15B:
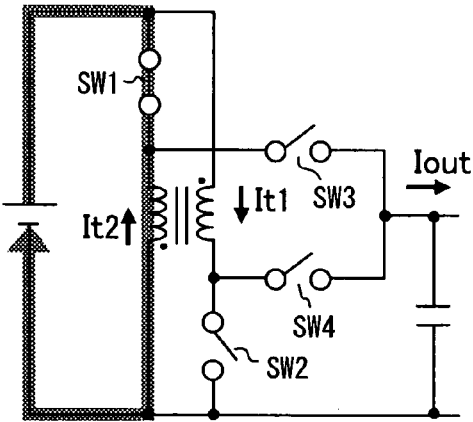
Figure 15B:
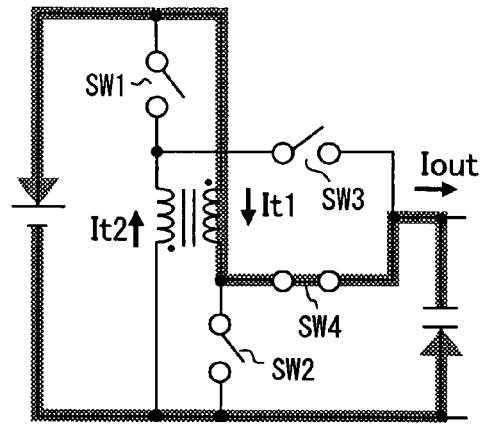
Figure 15B:
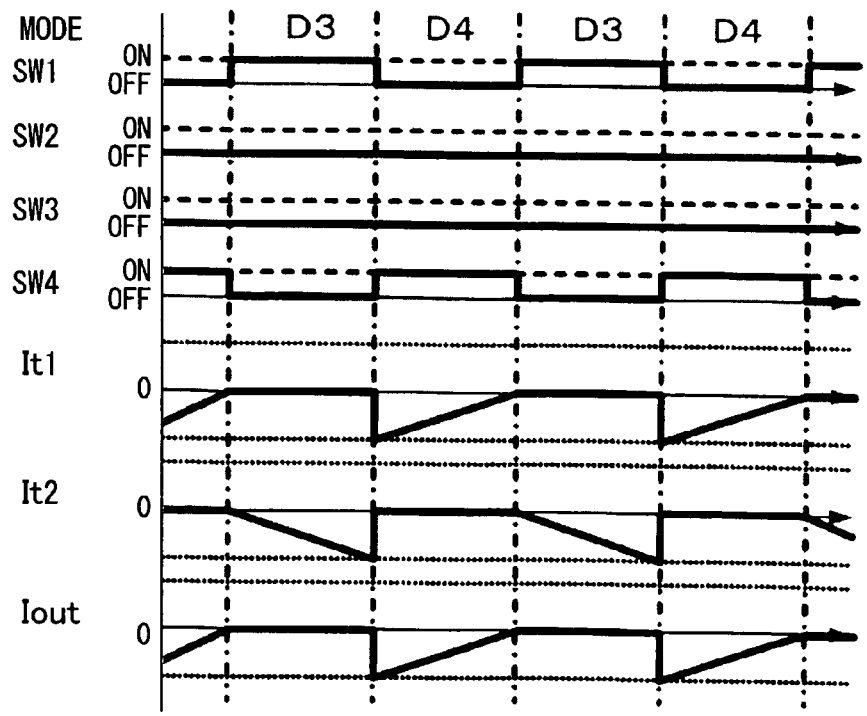
Figure 16A:
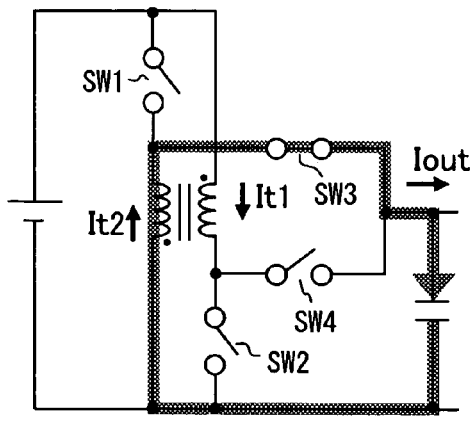
FIGS. 16A and 16B are diagrams illustrating a current variation in an operating mode E in the second embodiment.
Figure 16A:
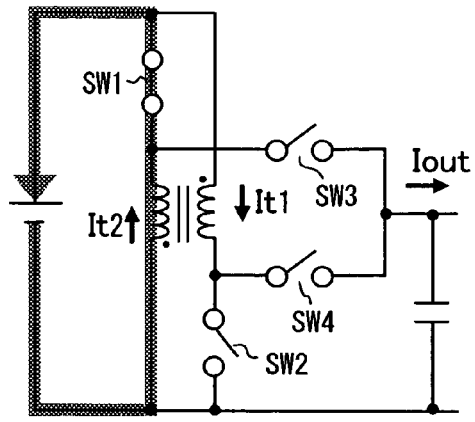
Figure 16A:
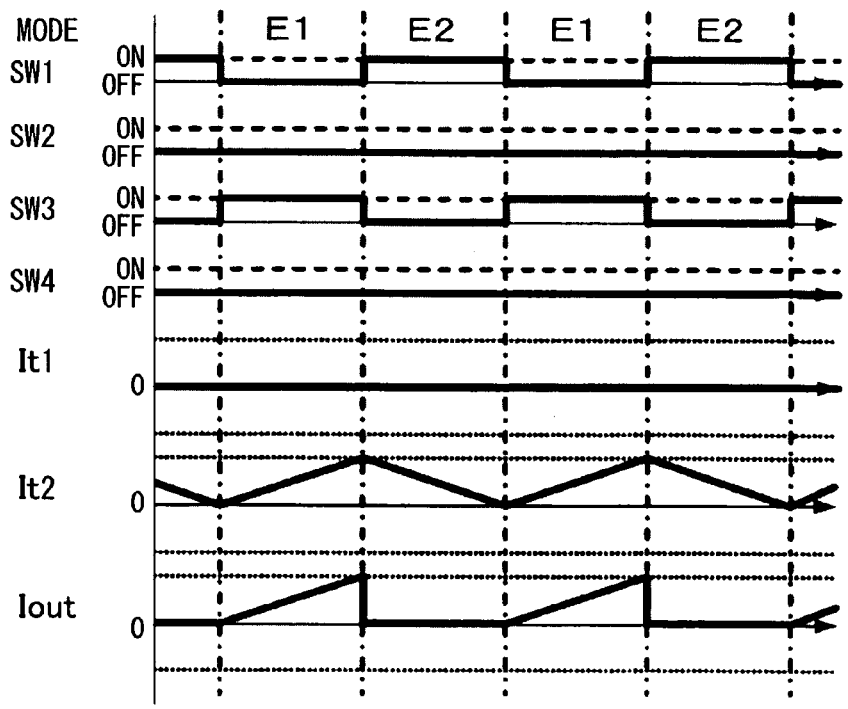
Figure 16B:
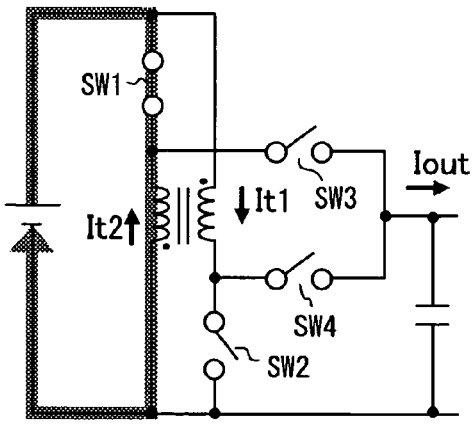
Figure 16B:
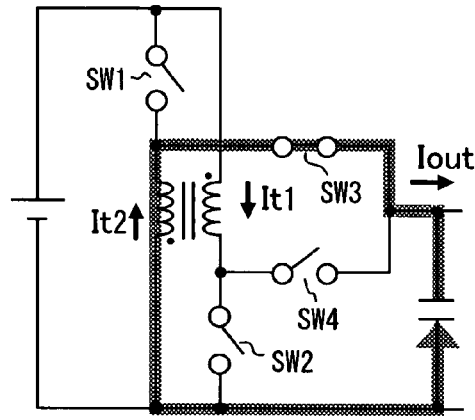
Figure 16B:
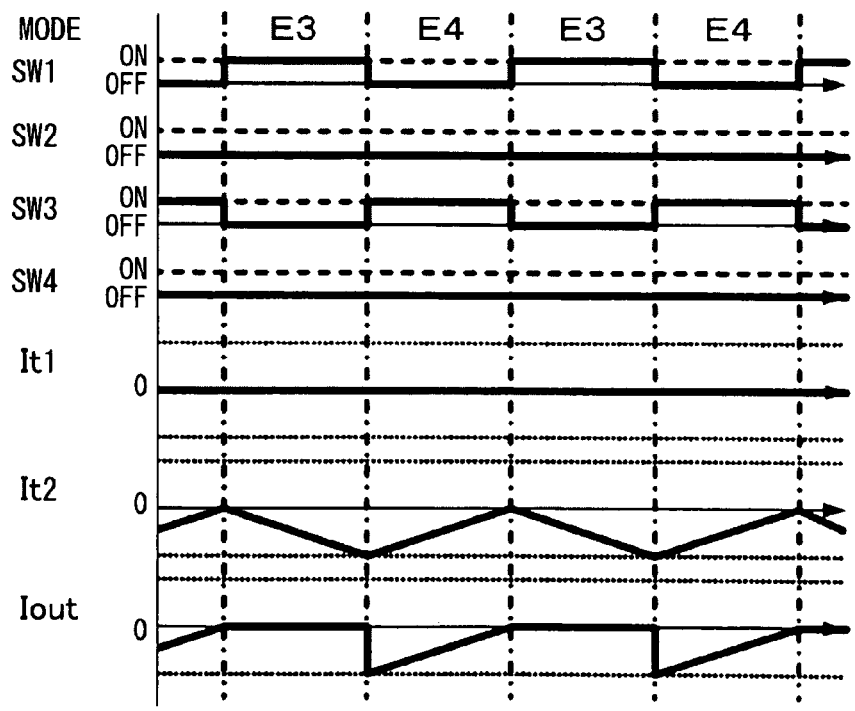
Figure 17:
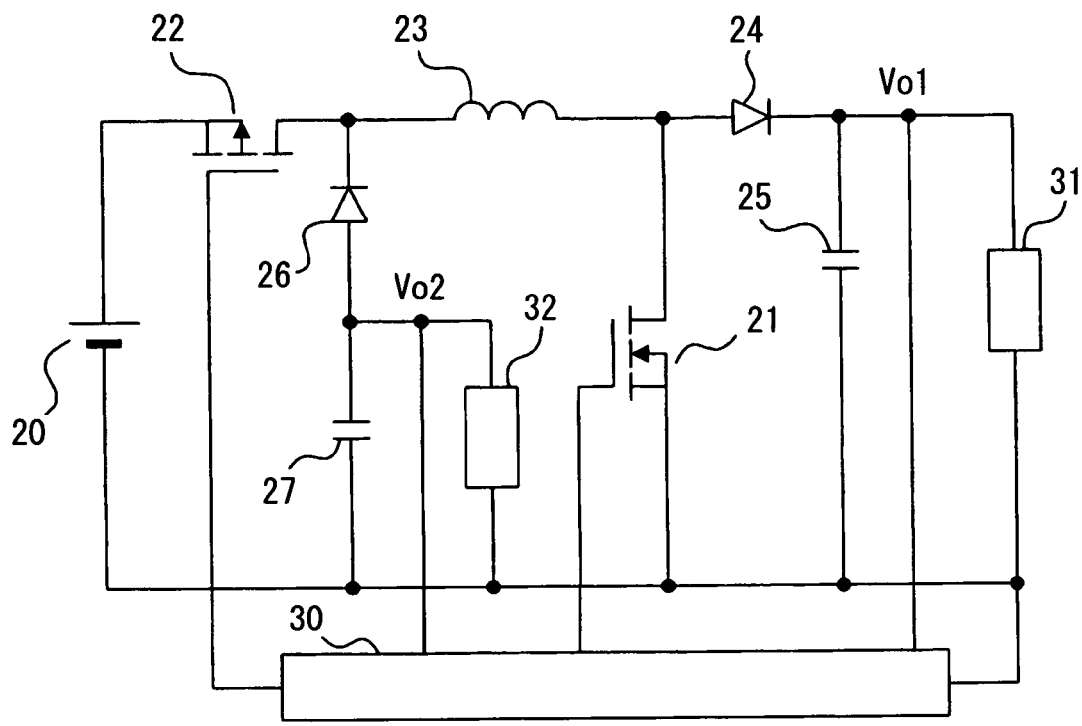
FIG. 17 is a circuit diagram illustrating circuitry of a conventional multiple-output DC-DC converter.

In the present embodiment, as shown in FIG. 11, the relationship between the output voltage Vout and driving frequency attained when the power conversion circuit 10 is operated in each of the operating modes A to E is measured. Based on the results of the measurement, the determinant voltages V1 to V4 in the mode determination unit 7 serving as switching voltages for switching of the operating modes A to E are determined in order to maximize the driving frequency of the power conversion circuit 10.

Namely, the results of the measurement shown in FIG. 11 demonstrate that a voltage value that is approximately $(1+\sqrt{5})/2$ times larger than the supply voltage Vin should be designated as the determinant voltage V1 serving as the switching voltage for switching between the step-up mode A and step-up-and-down mode B. A voltage value that is approximately $(-1+\sqrt{5})/2$ times larger than the supply voltage Vin should be designated as the determinant voltage V2 serving as the switching voltage for switching between the step-up-and-down mode B and step-down mode C. A voltage value that is approximately $(3-\sqrt{5})/2$ times larger than the supply voltage Vin should be designated as the determinant voltage V3 serving as the switching voltage for switching between the step-down mode C and inverted-output step-up-and-down mode D. A voltage value that is approximately $(1-\sqrt{5})/2$ times larger than the supply voltage Vin should be designated as the determinant voltage V4 serving as the switching voltage for switching between the inverted-output step-up-and-down mode D and inverted-output step-up mode E.

Consequently, the determinant voltages V1 to V4 which the mode determination unit 6 uses to determine an operating mode or, in other words, to determine a driving mode, are designated as $V1=Vin \times (1+\sqrt{5})/2$, $V2=Vin \times (-1+\sqrt{5})/2$, $V3=Vin \times (3-\sqrt{5})/2$, and $V4=Vin \times (1-\sqrt{5})/2$ respectively.

In order to drive the power conversion circuit in the current boundary mode, it is necessary to designate the on time of a switch needed to control the output voltage Vout into a command voltage. However, an amount of energy accumulated in the transformer 12 when a switch is first turned on within a driving cycle varies depending on an output voltage. Moreover, an amount of energy needed to control the output voltage Vout into a command voltage varies depending on a deviation of the output voltage Vout from the command voltage, an integral value of the deviation, or a load current.

The power conversion device of the present embodiment includes an output pulse width arithmetic unit 7 that detects a load current flowing from the power conversion circuit 10 to the load 2, and calculates an on time of a switch needed to control the output voltage Vout into a command voltage in a driving mode determined by the mode determination unit 6, as an initial output pulse width for the power conversion circuit 10 on the basis of the detected load current, the output voltage Vout, and the command voltage.

The control unit 9 outputs a pulsating signal having the output pulse width calculated by the output pulse width arithmetic unit 7 to a switch that should be first turned on within a driving cycle in a driving mode designated by the mode determination unit 6, thus holding the switch on during the on time. When the on time elapses, the switch to be turned on is switched to the other switch that should be turned on in the driving mode. Thereafter, the on state of the switch is sustained until currents flowing through the respective windings L1 and L2 of the transformer 12, that is, a primary current and a secondary current shown in the drawing become zero. According to such a procedure, two switches associated with each driving mode are sequentially turned on.

When the currents flowing through the respective windings L1 and L2 of the transformer 12, that is, the primary current and secondary current shown in the drawing become null, the control unit 9 decides that driving of the power conversion circuit 10 for one cycle has been completed, and re-executes output of a pulsating signal to a switch that should be first turned on in the current driving mode so as to proceed to the next driving cycle. Thereafter, according to the above described procedure, two switches are alternately turned on.

According to the power conversion device of the present embodiment, as shown in FIG. 12A to FIG. 16B, in whichever of the five operating modes A to E the power conversion circuit 10 is operated, currents flowing through the respective windings L1 and L2 of the transformer 12 can be restored to zero at every driving cycle during which two switches in the power conversion circuit 10 are alternately turned on. Consequently, according to the present embodiment, the turn-on loss can be prevented from occurring in the power conversion circuit 10, and responsiveness of control can be increased. It should be noted that FIG. 12A to FIG. 16B show the relationship among the currents It1 and It2 that flow through the respective windings L1 and L2 of the transformer 12 when the power conversion circuit 10 is operated in the current boundary mode, and the load current Iout flowing from the power conversion circuit 10 to the load 2.

In the present embodiment, the voltage detection circuit 3 is equivalent to the voltage detection means set forth in Claim 12, the mode determination unit 6 is equivalent to the driving mode selection means set forth in Claim 12, the output pulse width arithmetic unit 7 is equivalent to the on-time calculation means set forth in Claim 12, and the control unit 9 is equivalent to the drive means set forth in Claim 12.

The embodiments to which the present invention is applied have been described so far. However, the present invention is not limited to the embodiments but may take on various forms without a departure from the gist of the invention.

For example, the power conversion circuit to which the present invention is applied can be, as mentioned in relation to the embodiments, operated as a DC-DC converter of a step-up type, a step-up-and-down type, a step-down type, an inverted-output step-up-and-down type, or an inverted-output step-up type by changing switches to be alternately turned on from ones to others. However, the five driving modes need not always be designated for the power conversion circuit, to which the present invention is applied, so that a desired operating mode can be selected from among the five operating modes A to E. The number of kinds of switchable operating modes, or in other words, the number of kinds of driving modes may be decreased to four or three according to the usage of an output voltage.

As for the determinant voltages V1 to V4, it will be appreciated that for the output voltage Vout to be used to switch the operating modes of the power conversion circuit 10, or in other words, the driving modes for the power conversion circuit 10, details of the foregoing description in relation to the embodiments herein may be appropriately modified.

What is claimed is:

1. A power conversion circuit characterized by comprising:
   a transformer that includes a primary winding, which has one end connected to a positive electrode side of a direct-current power supply, and a secondary winding, which has one end connected to a negative electrode side of the DC power supply so that its phase is opposite to that of the primary winding, wherein a ratio between numbers of turns of the windings is set to 1:1;
   a capacitor for outputting voltage, the capacitor having one end connected to the negative electrode side of the DC power supply;
   a first switch interposed between an other end of the secondary winding of the transformer and the positive electrode side of the direct-current power supply;
   a second switch interposed between an other end of the primary winding of the transformer and the negative electrode side of the direct-current power supply;
   a third switch interposed between the other end of the secondary winding of the transformer and an other end of the capacitor; and
   a fourth switch interposed between the other end of the primary winding of the transformer and the other end of the capacitor.

2. The power conversion circuit according to claim 1, characterized in that the first to fourth switches include bidirectional switches capable of bi-directionally conducting or cutting off a current.

3. The power conversion circuit according to claim 2, characterized in that the bidirectional switches include a pair of MOSFETs including back-to-back diodes, wherein the back-to-back diodes are connected to each other so that the back-to-back diodes are oriented in mutually opposite directions.

4. The power conversion circuit according to claim 2, characterized in that the bidirectional switches include a pair of IGBTs including back-to-back diodes, wherein the back-to-back diodes are connected to each other so that the back-to-back diodes are oriented in mutually opposite directions.

5. The power conversion circuit according to claim 2, characterized in that the bidirectional switches include a pair of reverse-blocking IGBTs that are connected inversely in parallel with each other.

6. A driving method for controlling an output voltage of the power conversion circuit into an arbitrary voltage, which ranges from a negative voltage lower than a reference potential to a positive voltage higher than a potential on the positive electrode side of the direct-current power supply by driving the power conversion circuit set forth in claim 1, the reference potential being a potential on the negative electrode side of the direct-current power supply, the driving method characterized in that:
   according to the output voltage, a driving mode for the power conversion circuit is switched to any of:
   a first driving mode in which the second switch and fourth switch are alternately turned on and other switches are held in an off state;
   a second driving mode in which the second switch and third switch are alternately turned on and other switches are held in an off state;
   a third driving mode in which the fourth switch and third switch are alternately turned on and other switches are held in an off state;
   a fourth driving mode in which the fourth switch and first switch are alternately turned on and other switches are held in an off state; and
   a fifth driving mode in which the third switch and first switch are alternately turned on and other switches are held in an off state.

7. The power conversion circuit driving method according to claim 6, characterized in that:
   when the output voltage is equal to or higher than a first voltage higher than a supply voltage of the direct-current power supply, the first driving mode is selected;
   when the output voltage is close to the supply voltage when being equal to or higher than a second voltage, which is lower than the supply voltage of the direct-current power supply, and when being lower than the first voltage, the second driving mode is selected;
   when the output voltage is equal to or higher than a third voltage higher than a ground voltage corresponding to the reference potential and lower than the second voltage, the third driving mode is selected;
   when the output voltage is close to the ground voltage when being equal to or higher than a fourth voltage, which is lower than the ground voltage corresponding to the reference potential, and when being lower than the third voltage, the fourth driving mode is selected; and
   when the output voltage is lower than the fourth voltage, which is lower than the ground voltage corresponding to the reference potential, the fifth driving mode is selected.

8. The driving method for the power conversion circuit according to claim 7, characterized in that in each of the driving modes, a ratio at which the switches are alternately held on within a certain driving cycle is controlled so that the output voltage is equal to an externally fed command voltage.

9. The power conversion circuit driving method according to claim 7, characterized in that:
  in each of the driving modes, for each driving cycle of the switches,
  an on time of a switch needed to control the output voltage into the command voltage is calculated based on the output voltage, the command voltage, and a load current flowing into a load connected to the power conversion circuit;
  one switch is held on during the calculated on time; and
  after the on time elapses, an other switch is held on until a current flowing through the respective windings of the transformer become null.

10. The power conversion circuit driving method according to claim 9, characterized in that
  the first voltage has a voltage value that is approximately $(1+\sqrt{5})/2$ times larger than the supply voltage,
  the second voltage has a voltage value that is approximately $(-1+\sqrt{5})/2$ times larger than the supply voltage,
  the third voltage has a voltage value that is approximately $(3-\sqrt{5})/2$ times larger than the supply voltage, and
  the fourth voltage has a voltage value that is approximately $(1-\sqrt{5})/2$ times larger than the supply voltage.

11. A drive unit for a power conversion circuit that drives the power conversion circuit set forth in claim 1 and controls an output voltage of the power conversion circuit into an externally fed command voltage, the drive unit for the power conversion circuit characterized by comprising:
  a voltage detection means for detecting the output voltage of the power conversion circuit;
  a driving mode selection means for selecting as a driving mode for the power conversion circuit on the basis of the output voltage, which is detected by the voltage detection means, any of a first driving mode in which the second switch and fourth switch of the power conversion circuit are alternately turned on, a second driving mode in which the second switch and third switch of the power conversion circuit are alternately turned on, a third driving mode in which the fourth switch and third switch of the power conversion circuit are alternately turned on, a fourth driving mode in which the fourth switch and first switch of the power conversion circuit are alternately turned on, and a fifth driving mode in which the third switch and first switch of the power conversion circuit are alternately turned on;
  a ratio arithmetic means for computing the ratio between on times, during which two switches are alternately held on in each of the driving modes, on the basis of the output voltage detected by the voltage detection means and the externally fed command voltage; and
  a drive means for alternately holding two switches, which are employed in the driving mode selected by the driving mode selection means, on at the ratio calculated by the ratio arithmetic means, for each predetermined certain driving cycle.

12. A drive unit for the power conversion circuit that drives the power conversion circuit set forth in claim 1 and controls an output voltage of the power conversion circuit into an externally fed command voltage, the drive unit for the power conversion circuit characterized by comprising:
  a voltage detection means for detecting the output voltage of the power conversion circuit;
  a driving mode selection means for selecting as a driving mode for the power conversion circuit on the basis of the output voltage, which is detected by the voltage detection means, any of a first driving mode in which the second switch and fourth switch of the power conversion circuit are alternately turned on, a second driving mode in which the second switch and third switch of the power conversion circuit are alternately turned on, a third driving mode in which the fourth switch and third switch of the power conversion circuit are alternately turned on, a fourth driving mode in which the fourth switch and first switch of the power conversion circuit are alternately turned on, and a fifth driving mode in which the third switch and first switch of the power conversion circuit are alternately turned on;
  an on-time calculation means for calculating an on time of a switch, which is needed to control the output voltage into the command voltage, on the basis of the output voltage, the externally fed command voltage, and a load current, which flows into a load connected to the power conversion circuit, for each driving cycle of two switches employed in the driving mode selected by the driving mode selection means; and
  a drive means for holding one of two switches, which are employed in the driving mode selected by the driving mode selection means, on during the on time calculated by the on-time calculation means, and for, after the on time elapses, holding an other of the two switches on until a current flowing through each winding of the transformer become null.

* * * * *